United States Patent [19]
Miyake et al.

[11] Patent Number: 5,497,338
[45] Date of Patent: Mar. 5, 1996

[54] MOTION VECTOR DETECTING CIRCUIT

[75] Inventors: Toshiyuki Miyake, Tenri; Hiroshi Kusao, Chiba; Hiroyuki Katata, Ichihara, all of Japan

[73] Assignee: Sharp Kabushiki Kaisha, Osaka, Japan

[21] Appl. No.: 221,744

[22] Filed: Mar. 31, 1994

[30] Foreign Application Priority Data

Apr. 9, 1993 [JP] Japan ..... 5-083037
May 21, 1993 [JP] Japan ..... 5-119893

[51] Int. Cl.⁶ ..... H04B 14/06
[52] U.S. Cl. ..... 364/514 A; 364/516; 382/232
[58] Field of Search ..... 364/514, 517; 250/203.1; 382/16, 18, 19, 21, 48, 56

[56] References Cited

U.S. PATENT DOCUMENTS

| | | | |
|---|---|---|---|
| 4,910,594 | 3/1990 | Kondo | 358/138 |
| 4,992,869 | 2/1991 | Samad et al. | 358/140 |
| 5,034,965 | 7/1992 | Kato | 375/26 |
| 5,134,475 | 7/1992 | Johnston et al. | 358/133 |
| 5,144,423 | 9/1992 | Knauer et al. | 358/133 |

FOREIGN PATENT DOCUMENTS

| | | | |
|---|---|---|---|
| 0395274A3 | 10/1990 | Japan | G06F 15/70 |
| 4-26692 | 9/1992 | Japan . | |
| 04266292-A | 9/1992 | Japan | H04N 11/04 |

OTHER PUBLICATIONS

Teresa H., Y. Meng and Andy C. Gond, "Parallel Array architectures for Motion Estimation", IEEE 1991 Special Purpose Design II p. 214.

*Patent Abstracts of Japan*, vol. 17, No. 57(E–1315), 4 Feb. 1993, abstracting Kawai+/Fujitsu JP-A-04 266 292 (Sep. 22, 1992 publication of laid-open application).

*Primary Examiner*—Emanuel T. Voeltz
*Assistant Examiner*—Craig Steven Miller
*Attorney, Agent, or Firm*—David G. Conlin; Milton Oliver

[57] ABSTRACT

A motion vector detecting circuit is for detecting a motion vector in moving picture coding using motion compensation prediction in the unit of block composed of L pixels by block matching between a block in a prediction target image and a candidate block in a reference image. The motion vector detecting circuit comprises a calculating section for calculating a first prediction error between a block in a prediction target image and a candidate block in a reference image using L1 (<L) pixels in block, comparing the first prediction error thus calculated with a threshold, and calculating a second prediction error between a block in the prediction target image and a candidate block in the reference image using L2 (L1<L2≦L) pixels in block if a first prediction error of the candidate block is not more than the threshold; and a comparing section for comparing the second prediction error with a predetermined value and, if the second prediction error is smaller than the predetermined value, replacing the predetermined value with the second prediction error, whereby a motion vector to a candidate block giving a minimum second prediction error is determined as an optimum motion vector.

15 Claims, 13 Drawing Sheets

MOTION VECTOR DETECTING CIRCUIT

BACKGROUND OF THE INVENTION

1. Field of the Invention

The present invention relates to a motion vector detecting circuit, and more particularly to a motion vector detecting circuit for detecting a motion vector by block matching between a prediction target image and a reference image in moving image coding using the motion compensation prediction.

2. Related Background Art

There are major methods for obtaining a motion vector by block matching, for example the full search, the three-step search, etc. as described in "INTERFACE," pp 138, Aug. 1992.

The computational complexity is examined in the following for the conventional motion vector detecting methods.

In the following description, "sub" means subtraction, "add" addition, and "ops" computational complexity.

Also, it is assumed that a block is a square block in the size of 16×16 pixels, a search range of motion vector is a square region between −15 and +15 both in the horizontal direction and in the vertical direction, the accuracy of motion vector is one pixel unit, and a prediction error is a sum of absolute values of differences between pixel values.

1. Full search (1) A process for obtaining a prediction error PE using all pixels in block is executed for all candidate blocks of 961 (i.e., $31^2$).

(2) An optimum motion vector is a motion vector to a candidate block giving a minimum prediction error PE.

The above process requires the following computational complexity for block matching.

Computation of prediction error PE: 256 (sub)+255 (add)=511 ops

Comparison between prediction error PE and minimum: 1 ops

For all candidate blocks of 961, necessary computation is:

$$(511+1) \times 961 = 492032 \text{ ops.}$$

2. 3-step search (1) A process for obtaining a prediction error PE using all pixels in block is executed for candidate blocks corresponding to motion vectors (4 m, 4 n).

Here, m and n are integers between −3 and +3.

(2) A minimum value of the prediction errors PE obtained in (1) is defined as MIN PE and a motion vector giving MIN PE as (x, y). Then, a process for obtaining a prediction error PE using all pixels in block is conducted for eight candidate blocks corresponding to motion vectors (x−2, y−2), (x, y−2), (x+2, y−2), (x−2, y), (x+2, y), (x−2, y+2), (x, y+2), and (x+2, y+2). If PE<MIN PE then it is set as MIN PE=PE.

(3) A motion vector giving MIN PE in (2) is defined as (x, y). Then, a process for obtaining a prediction error PE using all pixels in block is conducted for eight candidate blocks corresponding to motion vectors (x−1, y−1), (x, y−1), (x+1, y−1), (x−1, y), (x+1, y), (x−1, y+1), (x, y+1), and (x+1, y+1). If PE<MIN PE then it is set as MIN PE=PE.

(4) A motion vector giving MIN PE in (3) is determined as an optimum motion vector.

The above process requires the following computational complexity for block matching.

Computation of prediction error PE: 511 ops

Comparison between prediction error PE and minimum MIN PE: 1 ops

Number of prediction errors PE obtained in (1): 7×7=49

Number of prediction errors PE obtained in (2): 8

Number of prediction errors PE obtained in (3): 8

Thus, the total computation is as follows:

$$(511+1) \times (49+8+8) = 33280 \text{ ops}$$

3. 2-step search (1) A process for obtaining a prediction error PE using all pixels in block is executed for candidate blocks corresponding to motion vectors (3 m, 3 n).

Here, m and n are integers between −5 and +5.

(2) A minimum value of prediction errors PE obtained in (1) is defined as MIN PE and a motion vector giving MIN PE as (x, y). Then, a process for obtaining a prediction error PE using all pixels in block is conducted for eight candidate blocks corresponding to motion vectors (x−1, y−1), (x, y−1), (x+1, y−1), (x−1, y), (x+1, y), (x−1, y+1), (x, y+1), and (x+1, y+1). If PE<MIN PE then it is set as MIN PE=PE.

(3) A motion vector giving MIN PE in (2) is determined as an optimum motion vector.

The above process requires the following computational complexity for block matching.

Computation of prediction error PE: 511 ops

Comparison between prediction error PE and minimum MIN PE: 1 ops

Number of prediction errors PE obtained in (1): 11×11=121

Number of prediction errors PE obtained in (2): 8

Thus, the total computation is as follows:

$$(511+1) \times (121+8) = 66048 \text{ ops}$$

As described above, the full search, however, requires the massive amounts of computational complexity for block matching.

Also, the 3-step search and the 2-step search cannot obtain a correct motion vector, because the search is limited to some candidate blocks. Thus, the quality of reproduced image is extremely degraded in the searches as compared with the full search.

SUMMARY OF THE INVENTION

It is an object of the present invention to provide a motion vector detecting circuit which can obtain a correct motion vector even with greatly reduced amounts of computational complexity.

The above object of the present invention can be achieved by a motion vector detecting circuit for detecting a motion vector in moving picture coding using motion compensation prediction in the unit of block composed of L pixels by block matching between a block in a prediction target image and a candidate block in a reference image, comprising:

calculating means for calculating a first prediction error (PE1) between a block in a prediction target image and a candidate block in a reference image using L1 (<L) pixels in block, comparing the first prediction error thus calculated with a threshold (TH), and calculating a second prediction error (PE2) between a block in the prediction target image and a candidate block in the reference image using L2 (L1<L2≦L) pixels in block if a first prediction error of said candidate block is not more than said threshold (TH); and comparing means for comparing said second prediction error with a predetermined value (MIN PE) and, if said second prediction error is smaller than said predetermined value (MIN_PE), replacing said predetermined value (MIN_PE) with said second prediction error, whereby a motion vector to a candidate block giving a minimum second prediction error is determined as an optimum motion vector.

In an aspect of the invention, said calculating means comprises a prediction error calculating unit for calculating the first prediction error (PE1) and the second prediction error (PE2), a comparator for comparing the first prediction error (PE1) with the threshold value (TH), and a control unit for controlling operations of said prediction error calculating unit and said comparator. Also, said comparing means comprises a comparator for comparing the second prediction error (PE2) with the predetermined value (MIN_PE), a register for storing the predetermined value (MIN PE) and an optimum motion vector, and a control unit for controlling operations of said comparator and said register.

In another aspect of the invention, said calculating means may further comprise a counter for counting a number of candidate blocks used in calculating second prediction errors thereof (PE2), a comparator for comparing said number with a predetermined value (M), and a control unit for finishing the block matching between a prediction target image and a reference image when said number reaches the predetermined value (M). Said predetermined value (M) is smaller than a total number (N) of candidate blocks in a reference image. Said calculating means may further comprise an updating unit for adjusting said predetermined value (M) and said threshold (TH). When a number of candidate blocks used in calculating second prediction errors thereof (PE2) reaches said predetermined value (M), said updating unit updates to increase said predetermined value (M) and updates to decrease said threshold (TH).

In another aspect, said calculating means may further comprise means for calculating a ratio (R) of a number of candidate blocks used in calculating second prediction errors thereof (PE2), to a number of candidate blocks used in calculating first prediction errors thereof (PE1), and updating means for adjusting the threshold (TH) according to said ratio (R). Said updating means comprises a comparator for comparing said ratio (R) with a predetermined value (RTH), and an updating unit for adjusting said threshold (TH) in accordance with comparison by said comparator, wherein said updating unit updates to decrease the threshold (TH) if said ratio (R) is larger than the predetermined value (RTH), while the updating unit updates to increase the threshold (TH) if said ratio (R) is smaller than the predetermined value (RTH).

In another aspect, the circuit further comprises a memory for storing information about candidate blocks with a first prediction error (PE1) not more than the threshold (TH), wherein said calculating means calculates second prediction errors (PE2) in the order of the first prediction errors (PE1) stored in the memory from the smallest. The number of candidate blocks to calculate a second prediction error is not more than a selected value (M).

In another aspect, said calculating means comprises:

means for calculating a first prediction error (PE1) for all candidate blocks and stores the first prediction errors thereof;

means for producing a histogram of the first prediction errors;

means for calculating a cumulative value of frequencies of the first prediction errors in the histogram from the smallest;

means for comparing said cumulative value with a predetermined value (M);

storing means for storing as a threshold (TH) a maximum first prediction error with a cumulative value not more than said predetermined value (M);

comparing means for comparing said stored first prediction errors of all candidate blocks with said threshold (TH) in order; and calculating means for calculating a second prediction error (PE2) for candidate blocks with a first prediction error not more than the threshold (TH).

In another aspect, said storing means stores as a first threshold (TH1) a maximum first prediction error with a cumulative value not more than said predetermined value (M), a value (M−m) obtained by subtracting a cumulative value (m) thereat from the predetermined value (M), and as a second threshold (TH2) a minimum first prediction error with a cumulative value exceeding said predetermined value (M);

wherein said comparing means compares the stored first prediction errors of all candidate blocks with said first and second thresholds (TH1, TH2) in order; and wherein said calculating means calculates a second prediction error (PE2) for candidate blocks with a first prediction error not more than the first threshold (TH1) and calculates a second prediction error (PE2) for (M−m) candidate blocks among candidate blocks with a first prediction error larger than the first threshold (TH1) but not more than the second threshold (TH2).

Said histogram producing means may produce a histogram only for candidate blocks with a first prediction error (PE1) not more than the threshold (TH).

In the motion vector detecting circuit of the present invention, a first prediction error is calculated by matching operation between a block in a prediction target image and a candidate block as to L1 pixels less than L. If the calculated first prediction error is not more than a threshold, a second prediction error defining a motion vector is calculated for the candidate block corresponding to the first prediction error as to L2 (larger than L1 but not more than L) pixels. The comparing means compares second prediction errors as to detect a minimum prediction error defining a motion vector among the second prediction errors calculated by the calculating means. Accordingly, the computational complexity necessary for block matching can be greatly decreased and a motion vector can be detected with high accuracy.

In the another motion vector detecting circuit of the present invention, a process for calculating a prediction error PE1 is first carried out for all candidate blocks, using L1 (<L) pixels in block. Next, a histogram is produced with prediction error PE1 on the horizontal axis, frequencies of prediction errors PE1 are accumulated from the smallest, and a threshold TH is determined as a maximum prediction error PE1 with cumulative value thereof not more than M (<N). Subsequently, a process for obtaining a prediction error PE2 is carried out only for candidate blocks with prediction error PE1 not more than the threshold TH, using L2 (L1<L2≦L) pixels in block.

Employing the motion vector detecting circuits of the present invention, the computational complexity necessary for block matching can be greatly decreased and a motion vector can be obtained with very high accuracy as substantially equivalent to that by the full search.

Further objects and advantages of the present invention will be apparent from the following description of the preferred embodiments of the invention as illustrated in the accompanying drawings.

DESCRIPTION OF THE PREFERRED EMBODIMENTS

The embodiments of the present invention will be described with reference to the accompanying drawings. In the embodiments, a motion vector is detected in the unit of block including L pixels by block matching between a block in a prediction target image and N candidate blocks in a reference image.

Figure 1:
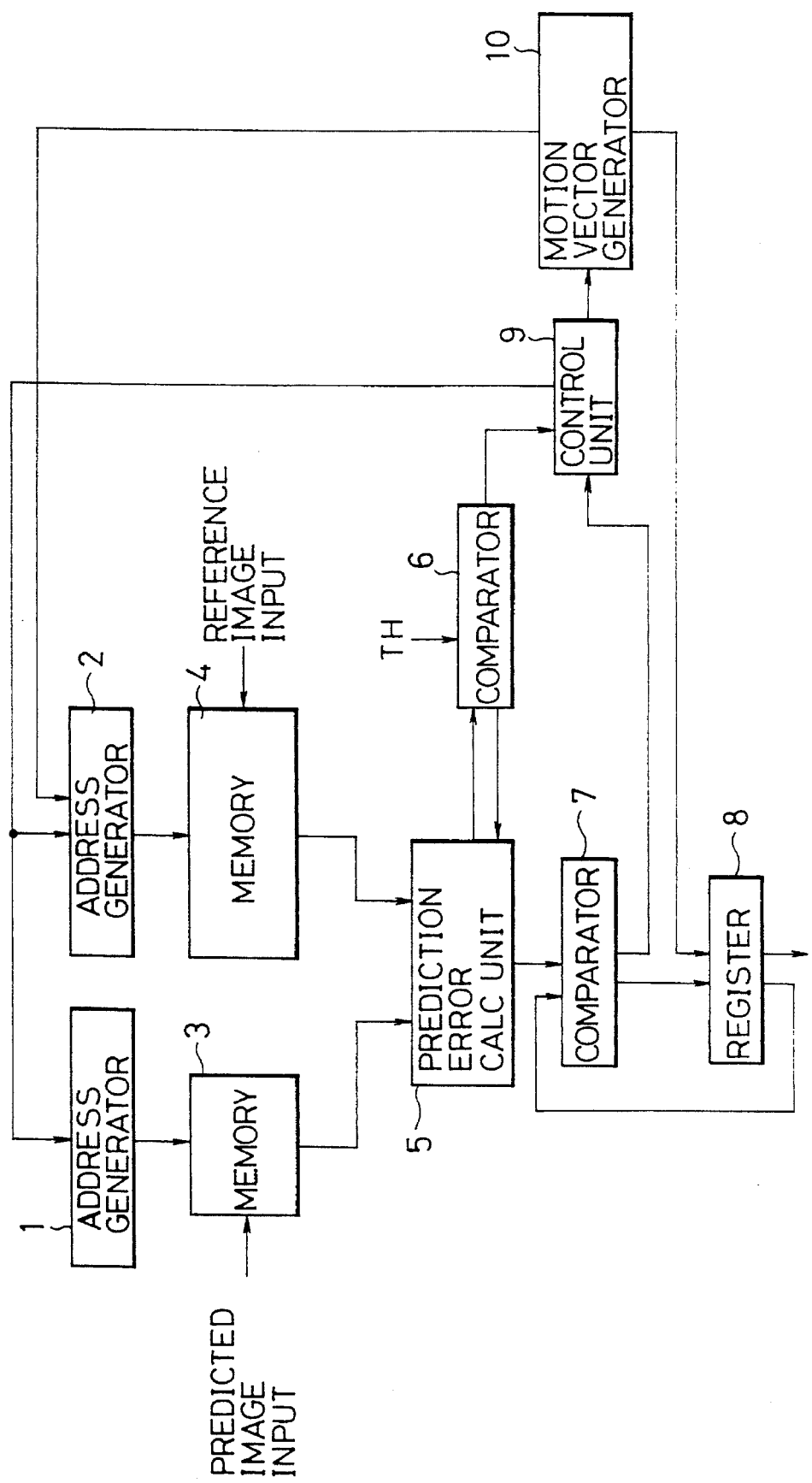
FIG. 1 is a drawing to show a first embodiment of motion vector detecting circuit according to the present invention.

FIG. 1 is a drawing to show a first embodiment of motion vector detecting circuit according to the present invention.

In FIG. 1, reference numeral 1 designates an address generator, which generates address information for pixels used in obtaining a prediction error PE1 about L1 (<L) pixels in a unit block, and address information for pixels to be used in obtaining a prediction error PE2 about L2 (L1<L2≦L) pixels in accordance with a control signal from a control unit 9.

Here, the L2 pixels to be used in obtaining a prediction error PE2 include the L1 pixels to be used in obtaining a prediction error PE1, and in obtaining a prediction error PE2 the generator 1 generates only address information about (L2–L1) pixels which were not used in obtaining a prediction error PE1 among the L2 pixels.

Numeral 2 also denotes an address generator, which receives a control signal from the control unit 9 and motion vector information from a motion vector generator 10. The address generator 2 generates address information about L1 pixels within a candidate block corresponding to the motion vector information, to be used in obtaining a prediction error PE1, and address information about L2 pixels in the candidate block to be used in obtaining a prediction error PE2.

Here, the L2 pixels to be used in obtaining a prediction error PE2 include the L1 pixels to be used in obtaining a prediction error PE1. The generator 2 generates only address information about (L2–L1) pixels which were not used in obtaining a prediction error PE1 among the L2 pixels in the candidate block, in obtaining a prediction error PE2.

Numeral 3 denotes a memory for storing information of prediction target image in block unit, from which the stored information is read out according to the information from the address generator 1.

Numeral 4 also denotes a memory for storing information about search region within a reference image, from which the information is read out according to the information from the address generator 2.

Numeral 5 denotes a prediction error calculating unit, which calculates a prediction error between a prediction target block and a candidate block. The calculating unit 5 calculates a prediction error PE2 in such a manner that a prediction error is first calculated for (L2–L1) pixels not used in obtaining a prediction error PE1 among L2 pixels and the thus obtained prediction error is added to the prediction error PE1. A prediction error may be obtained for example by a method for calculating a cumulative sum of absolute values of pixel value differences between corresponding pixels in a prediction target block and in a candidate block.

Numeral 6 represents a comparator for comparing a prediction error PE1 with a threshold TH.

Numeral 7 designates a comparator, and 8 a register for storing a minimum value MIN_PE and a motion vector giving the minimum value MIN_PE. The comparator 7 compares a prediction error PE2 with the minimum value MIN_PE stored in the register 8.

Numeral 9 is a control unit. The control unit 9 generates a control signal for obtaining a prediction error PE2, if a prediction error PE1 is not more than the threshold TH in a comparison in comparator 6. The control unit 9 generates a control signal for obtaining a prediction error PE1 for a next candidate block, if a prediction error PE1 is larger than the threshold TH in the comparison in comparator 6 or if the process of comparator 7 is completed.

Numeral 10 is a motion vector generator. The motion vector generator 10 generates information on motion vector to a next candidate block under control of the control unit 9, if a prediction error PE1 is larger than the threshold TH in the comparison in comparator 6 or if the processing of comparator 7 is finished.

In the above-described circuit, the address generators 1, 2, the memories 3, 4, the prediction error calculating unit 5, the comparator 6, the control unit 9 and the motion vector generator 10 constitute calculating means, while the comparator 7, the register 8, the control unit 9 and the motion vector generator 10 constitute comparing means.

The processing procedure is described in the following.

(1) The threshold of prediction error PE1 is set to TH.

(2) The prediction error calculating unit 5 calculates a prediction error PE1 using L1 (<L) pixels in a block, and the comparator 6 compares the thus obtained prediction error PE1 with the threshold TH.

(3) If the prediction error PE1 is not more than the threshold, the prediction error calculating unit 5 calculates a prediction error PE2 using L2 (L1<L2≦L) pixels in the block. The comparator 7 compares the thus obtained prediction error PE2 with the minimum value MIN_PE. If the prediction error PE2 is smaller than the minimum value MIN_PE, the prediction error PE2 is assigned as a new minimum value MIN PE and stored in the register 8 together with a motion vector thereof.

(4) The steps in (2) and in (3) are repeated for all candidate blocks, and a motion vector finally stored in the register 8 is determined as an optimum motion vector.

In the initial setting of the above procedure a maximum value which the prediction error PE2 can take is set in the register 8 as the minimum value MIN PE of prediction error PE2. If all candidate blocks give prediction errors PE1 larger than the threshold TH, an optimum motion vector can be determined by either of the following methods.

(1) A specific motion vector is assigned as an optimum motion vector.

(2) A same motion vector as that of a previous prediction target block is assigned as an optimum motion vector.

(3) A motion vector to a candidate block giving a minimum prediction error PE1 is assigned as an optimum motion vector.

The method (1) can be so realized that in initial setting, specific values, for example (0, 0), are set as a motion vector in register 8.

The method (2) can be so realized that in initial setting, values in previous processing are maintained without setting a motion vector in the register 8.

The method (3) can be so realized that means is provided for storing a minimum value of prediction error PE1 and values of a motion vector thereof.

Figure 7:
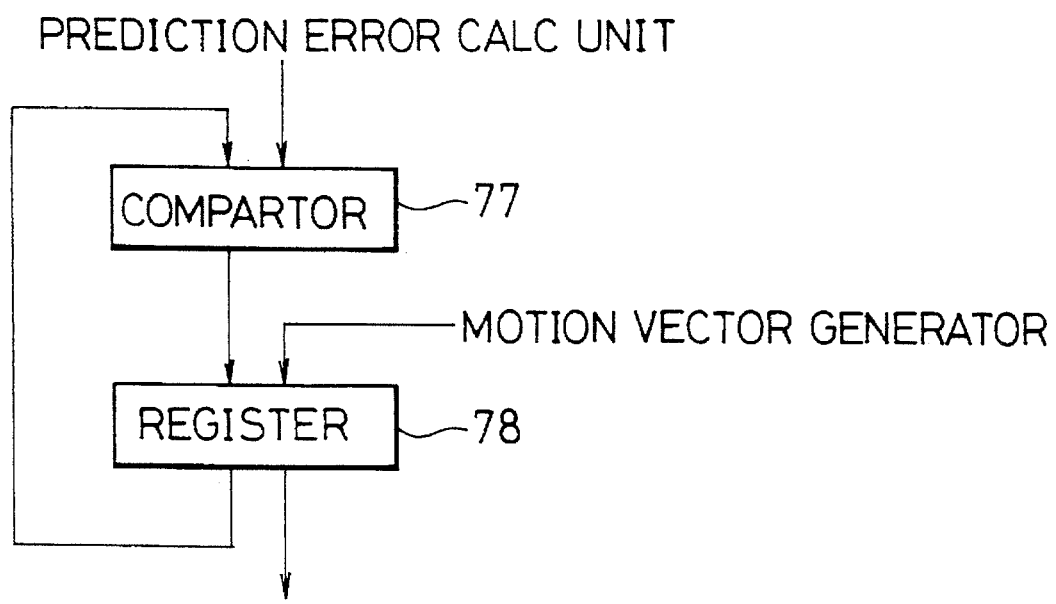
FIG. 7 is a drawing to illustrate means for obtaining a minimum value of prediction error PE1.

FIG. 7 is a drawing to illustrate means for obtaining the minimum value of prediction error PE1. In FIG. 7, numeral 77 designates a comparator and 78 a register. The comparator 77 compares a prediction error PE1 with a minimum value of prediction error PE1 stored in the register 8, and the register 78 stores a minimum value of prediction error PE1 and a motion vector corresponding thereto. The register 78 is updated if a prediction error PE1 is smaller than a minimum value of prediction error PE1 already stored. The method (3) can be thus conducted by adding the comparator 77 and the register 78 to the prediction error calculating unit 5.

Next described is the computational complexity necessary for block matching in the above procedure. Here, "sub" represents subtraction, "add" addition, and "ops" computational complexity. Also, it is assumed that a block is a square block in the size of 16×16 pixels, the search range of motion vector is a square region between −15 and +15 both in the horizontal direction and in the vertical direction, and the accuracy of motion vector is one pixel unit.

Supposing L1=16 and L2=256, the computational complexity necessary for the above process is calculated as follows.

Calculation of prediction error PE1: 16 (sub)+15 (add)= 31 ops

Comparison between prediction error PE1 and threshold TH: 1 ops

Calculation of prediction error PE2: 240 (sub)+240 (add)=480 ops

Comparison between prediction error PE2 and minimum value MIN_PE: 1 ops

Letting $\alpha$ be the number of candidate blocks to obtain the prediction error PE2, the computational complexity is as follows:

$$(31+1) \times 31^2 + (480+1) \times \alpha = 30752 + 481 \, \alpha \, ops.$$

As described above, the prediction error PE2 is calculated only for candidate blocks with prediction error PE1 being not more than the threshold TH, whereby a motion vector can be obtained by computational complexity less than that in the full search.

Figure 6:
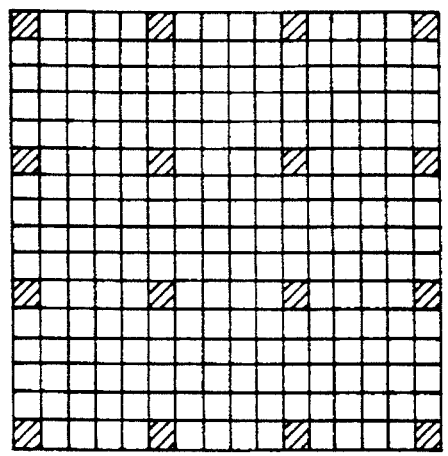
FIG. 6 is a drawing to illustrate an example of pixels used in obtaining a prediction error with L1 pixels.

FIG. 6 is a drawing to illustrate pixels used in obtaining a prediction error about L1 pixels. In FIG. 6, solid squares represent an example of pixels used in obtaining a prediction error for L1 (16) pixels.

The following description concerns an example in which the above method is applied to a portion of motion vector detection in moving picture coding method MPEG2 under progress in standardization by ISO. For calculation of prediction error PE1, the sixteen pixels as shown in FIG. 6 were used and the threshold TH was 320. If prediction errors PE1 of all candidate blocks are larger than the threshold TH, a motion vector to a candidate block giving a minimum prediction error PE1 is determined as an optimum motion vector.

Sequence 1 is a 2-sec moving picture with panning and Sequence 2 a 2-sec moving picture in which an object moving in the horizontal direction and in the perpendicular direction exists.

(1) A rate of omitted candidate blocks with PE1>TH is as follows (unit: %):

70.09 for Sequence 1; 80.28 for Sequence 2.

(2) Average differences (unit: pixel) of motion vectors from those obtained by the full search are as follows.

FD means a distance between a prediction target frame and a reference frame. Results by the 3-step search and the 2-step search are also listed for reference in addition to the results by the present embodiment.

|    | 3-step search | | 2-step search | | Embodiment 1 | |
|----|------|------|------|------|------|------|
| FD | X    | Y    | X    | Y    | X    | Y    |
| Sequence 1 | | | | | | |
| 1  | 1.21 | 1.40 | 0.97 | 0.83 | 0.08 | 0.09 |
| 2  | 1.59 | 1.38 | 1.43 | 1.13 | 0.25 | 0.25 |
| 3  | 2.20 | 1.89 | 1.84 | 1.47 | 0.52 | 0.45 |
| Sequence 2 | | | | | | |
| 1  | 1.50 | 1.38 | 1.60 | 1.36 | 0.11 | 0.10 |
| 2  | 1.83 | 1.36 | 1.18 | 0.89 | 0.18 | 0.15 |
| 3  | 2.17 | 1.80 | 1.91 | 1.43 | 0.27 | 0.20 |

(3) Quality of luminance signal of reproduced image (SN ratio in the unit of dB)

Results by the 3-step search and 2-step search are also listed for reference in addition to the results by the present embodiment. Values in parentheses are differences with respect to the results by the full search.

| Full search | 3-step search | 2-step search | Embodiment 1 |
|---|---|---|---|
| Sequence 1 | | | |
| 28.02 | 27.14 | 27.30 | 27.90 |
| | (−0.88) | (−0.72) | (−0.12) |
| Sequence 2 | | | |
| 25.96 | 24.57 | 24.99 | 25.85 |
| | (−1.39) | (−0.97) | (−0.11) |

It is seen from the above results that the present embodiment can provide a motion vector substantially equivalent in accuracy and in quality (SN ratio) to that by the full search even if the computational complexity is cut 70% to 80 %. Also, the present embodiment can obtain a motion vector more accurately and provide an image with better quality as compared with the 3-step search and the 2-step search.

Figure 2:
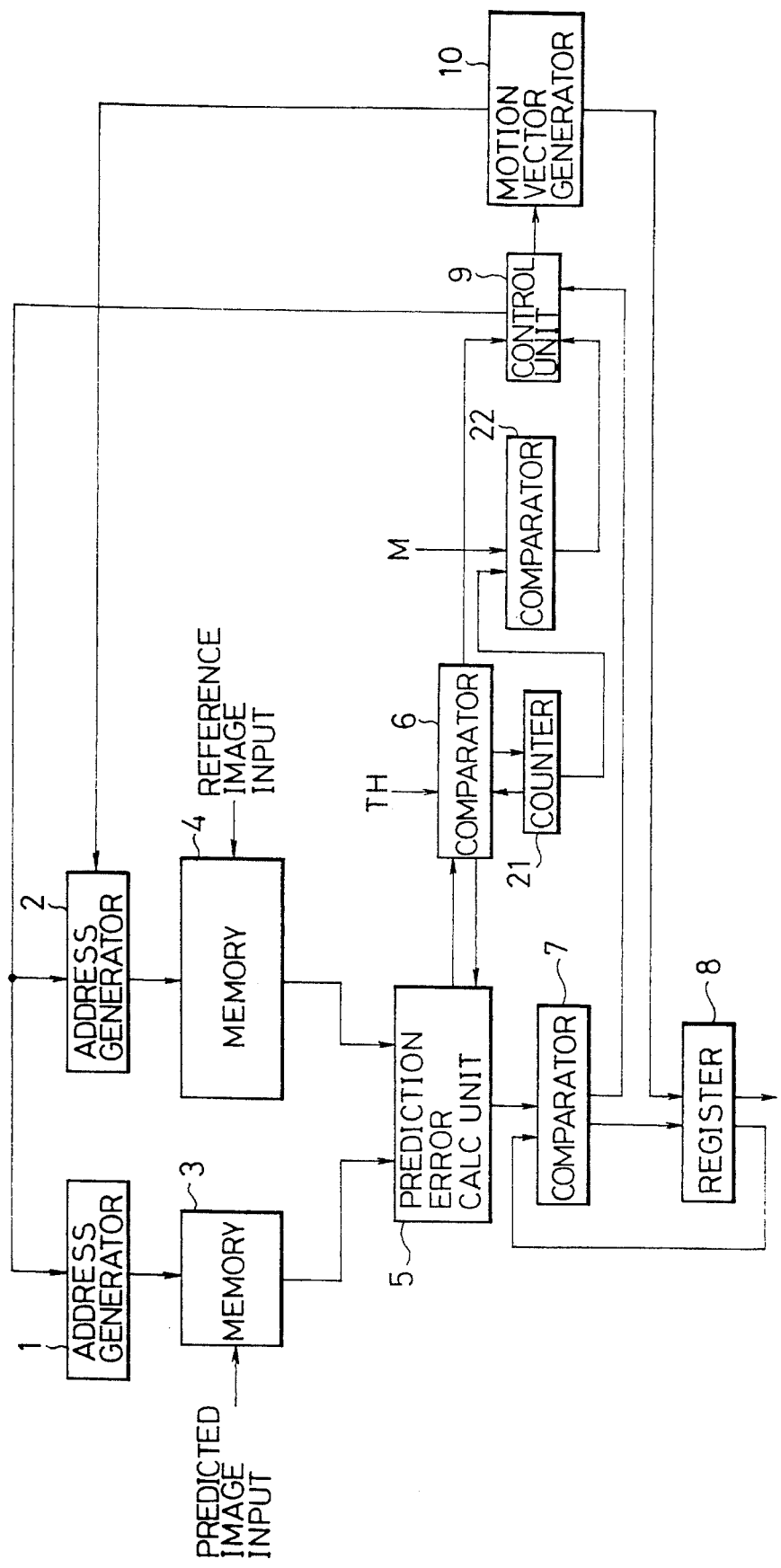
FIG. 2 is a drawing to show a second embodiment of motion vector detecting circuit according to the present invention.

FIG. 2 is a drawing to show a second embodiment of motion vector detecting circuit according to the present invention. The present embodiment has a circuit arrangement obtained by adding a counter 21 and a comparator 22 to the circuit shown in FIG. 1. The counter 21 counts the number of candidate blocks having a prediction error PE1 not more than the threshold TH. The comparator 22 compares a value of counter 21 with a value of maximum M (<total number N) of number of candidate blocks to obtain a prediction error PE2.

The processing procedure is described in the following.

(1) The counter 21 is set to 0, the threshold of prediction error PE1 to TH, and the maximum of number of candidate blocks to obtain a prediction error PE2 to M.

(2) The prediction error calculating unit 5 calculates a prediction error PE1 using L1 (<L) pixels in a block, and the comparator 6 compares the prediction error PE1 with the threshold TH.

(3) If the prediction error PE1 is not more than the threshold TH, an increment is given to the counter 21. Then, the prediction error calculating unit 5 calculates a prediction error PE2 using L2 (L1<L2≦L) pixels, and the comparator 7 compares the prediction error PE2 with the minimum value MIN PE. If the prediction error PE2 is smaller than the minimum value MIN PE, the prediction error PE2 is stored as a new minimum value MIN PE in the register 8 together with a motion vector thereof.

(4) The steps of from (2) to (3) are repeated before the value of counter 21 reaches M or before no candidate block remains. A motion vector finally stored in the register 8 is determined as an optimum motion vector.

The treatment is the same as in the first embodiment, if prediction errors PE1 of all candidate blocks are larger than the threshold TH.

Below described is the computational complexity necessary for block matching in the above method. Here, "sub" means subtraction, "add" addition, and "ops" computational complexity. It is also assumed that a block is a square block in the size of 16×16 pixels, the search range of motion vector is a square region between −15 and +15 both in the horizontal direction and in the vertical direction, and the accuracy of motion vector is one pixel unit.

Supposing L1=16 and L2=256, the computational complexity necessary for the above procedure is calculated as follows.

Calculation of prediction error PE1: 16 (sub)+15 (add)= 31 ops

Comparison between prediction error PE1 and threshold TH: 1 ops

Calculation of prediction error PE2: 240 (sub)+240 (add)=480 ops

Comparison between prediction error PE2 and minimum value MIN PE: 1 ops

Thus, letting $\beta$ be the number of candidate blocks used in calculating the prediction error PE1 and $\alpha$ be the number of candidate blocks used in calculating the prediction error PE2, the computational complexity is as follows:

(31+1)×$\beta$+(480+1)×$\alpha$=32 $\beta$+481 $\alpha$ ops. The maximum is 30752+481M ops.

As described above, the prediction error PE2 is calculated only for candidate blocks with prediction error PE1 not more than the threshold TH, whereby a motion vector can be obtained by computational complexity less than that by the full search.

Figure 3:
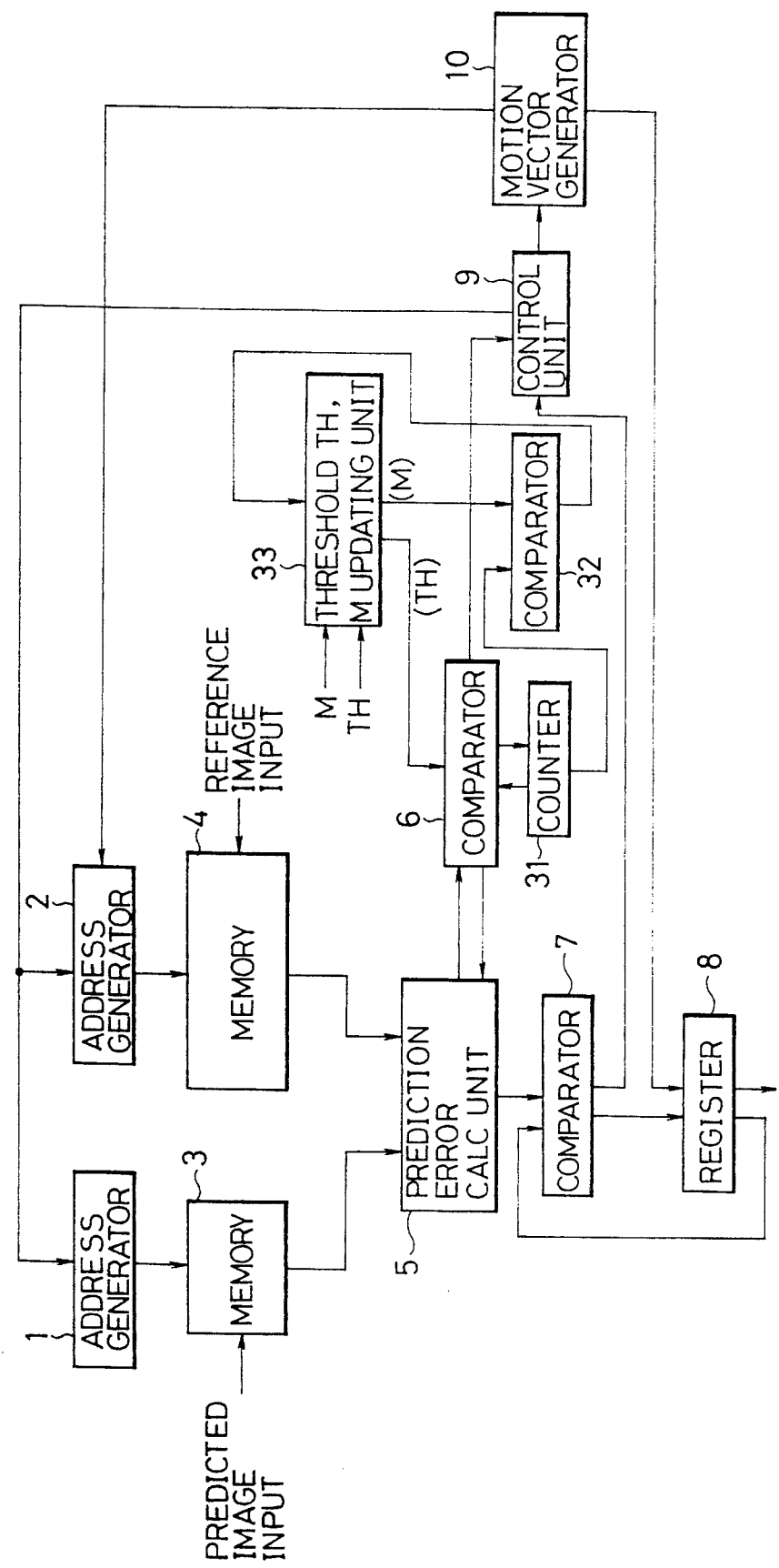
FIG. 3 is a drawing to show a third embodiment of motion vector detecting circuit according to the present invention.

FIG. 3 is a drawing to show a third embodiment of motion vector detecting circuit according to the present invention. The present embodiment has a circuit arrangement obtained by adding a counter 31, a comparator 32, and a threshold (TH, M) updating unit 33 to the circuit shown in FIG. 1. The counter 31 counts the number of candidate blocks with prediction error PE1 not more than the threshold TH. The comparator 32 compares a value of counter 31 with a value of maximum M (<N) of number of candidate blocks to calculate a prediction error PE2. The threshold (TH, M) updating unit 33 updates the threshold TH as to reduce it and the maximum M as to increase it, if the value of counter 31 is larger than M.

The processing procedure is described in the following.

(1) The counter 31 is set to 0, the threshold of prediction error PE1 to TH, the maximum of number of candidate blocks for obtaining a prediction error PE2 to M.

(2) The prediction error calculating unit 5 calculates a prediction error PE1 using L1 (<L) pixels in a block, and the comparator 6 compares the prediction error PE1 with the threshold TH.

(3) If the prediction error PE1 is not more than the threshold TH, the prediction error calculating unit 5 calculates a prediction error PE2 using L2 (L1<L2≦L) pixels. The comparator 7 compares the prediction error PE2 with the minimum value MIN PE. If the prediction error PE2 is smaller than the minimum value MIN PE, the prediction error PE2 is stored as a new minimum value MIN PE in the register 8 together with a motion vector thereof, and the counter 31 is given an increment. Then the comparator 32 compares the value of counter 31 with M. If the value of counter 31 is larger than M, the threshold (TH, M) updating unit 33 updates the threshold TH as decreasing it and the maximum M as increasing it.

(4) The steps of from (2) to (3) are repeated for all candidate blocks, and a motion vector finally stored in the register 8 is determined as an optimum motion vector.

The treatment is the same as in the first embodiment if prediction errors PE1 of all candidate blocks are larger than the threshold TH.

Next described is the computational complexity necessary for block matching in the above method. Here, "sub" means subtraction, "add" addition, and "ops" computational complexity. Also, it is assumed that a block is a square block in the size of 16×16 pixels, the search range of motion vector is a square region between −15 and +15 both in the horizontal direction and in the vertical direction, and the accuracy of motion vector is one pixel unit.

Supposing L1=16 and L2=256, the computational complexity necessary for the above processing is calculated as follows.

Computation of prediction error PE1: 16 (sub)+15 (add)= 31 ops

Comparison between prediction error PE1 and threshold TH: 1 ops

Computation of prediction error PE2: 240 (sub)+240 (add)=480 ops

Comparison between prediction error PE2 and minimum value MIN_PE: 1 ops

Thus, letting α be the number of candidate blocks used in obtaining the prediction error PE2, the computational complexity is as follows:

$$(31+1) \times 31^2 + (480+1) \times \alpha = 30752 + 481 \; \alpha \, ops.$$

As described above, the prediction error PE2 is obtained only for candidate blocks with prediction error PE1 not more than the threshold TH, whereby a motion vector can be obtained by computational complexity less than that by the full search. In an alternative arrangement, a maximum value of M may be preliminarily determined and the search may be stopped when the value of counter 31 reaches the maximum value, which can keep the computational complexity below a certain level.

Figure 4:
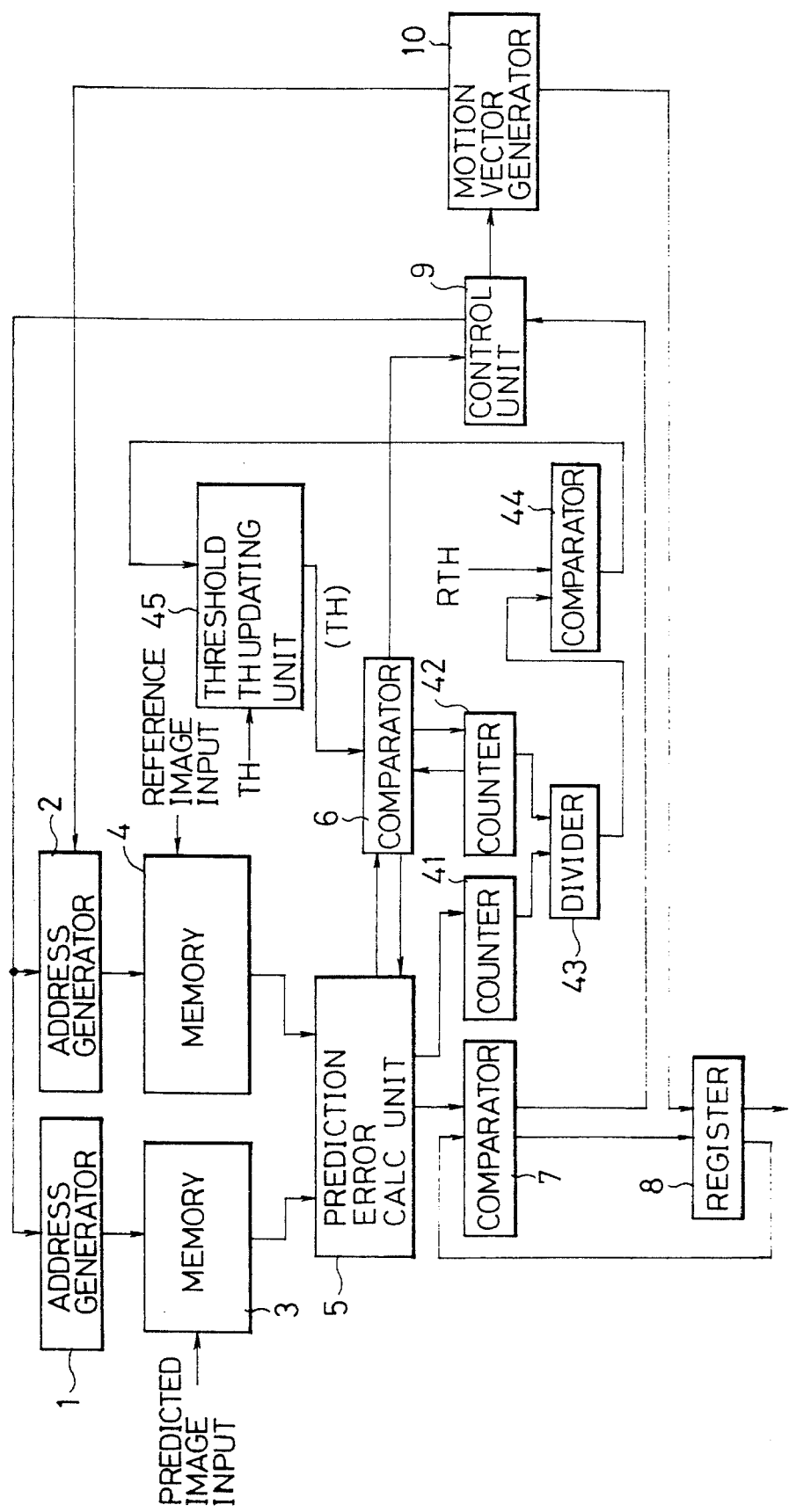
FIG. 4 is a drawing to show a fourth embodiment of motion vector detecting circuit according to the present invention.

FIG. 4 is a drawing to show a fourth embodiment of motion vector detecting circuit according to the present invention. The present embodiment is so arranged that the threshold TH is updated according to a ratio R of number of candidate blocks used in obtaining a prediction error PE2 to number of candidate blocks used in obtaining a prediction error PE1 at a certain moment. If R is less than a predetermined value RTH, the threshold TH is updated to increase; if R is larger than RTH, the threshold TH is updated to decrease. If R is equal to RTH, the threshold TH is kept unchanged.

The present embodiment has a circuit arrangement obtained by adding counters 41, 42, a divider 48, a comparator 44, and a threshold (TH) updating unit 45 to the circuit shown in FIG. 1. The counter 41 counts the number of candidate blocks for which the prediction error PE1 was already calculated. The counter 42 counts the number of candidate blocks with prediction error PE1 not more than the threshold TH, that is, the number of candidate blocks for which the prediction error PE2 was also calculated. The divider 43 calculates a ratio R of the number of candidate blocks for which the prediction error PE2 was calculated, to the number of candidate blocks for which the prediction error PE1 was calculated. The comparator 44 compares R with RTH. The threshold (TH) updating unit 45 updates the threshold TH as increasing it if R is less than RTH. If R is larger than RTH, the updating unit 45 updates TH as decreasing it. If R is equal to RTH, the threshold is kept unchanged.

The processing procedure is described in the following.

(1) The counters 41, 42 are set to 0, the threshold of prediction error PE1 to TH, and the threshold of ratio R to RTH.

(2) The prediction error calculating unit 5 calculates a prediction error PE1 using L1 (<L) pixels in a block, and gives an increment to the counter 41, and the comparator 6 compares the prediction error PE1 with the threshold TH.

(3) If the prediction error PE1 is not more than the threshold TH, the counter 42 is given an increment. The prediction error calculating unit 5 then calculates a prediction error PE2 using L2 (L1<L2≦L) pixels, and the comparator 7 compares the prediction error PE2 with the minimum value MIN_PE. If the prediction error PE2 is smaller than the minimum value MIN_PE, the prediction error PE2 is stored as a new minimum value MIN_PE in the register 8 together with a motion vector thereof.

(4) The divider 43 calculates a current ratio R of the number of candidate blocks used for calculation of prediction error PE2 to the number of candidate blocks used for calculation of prediction error PE1, and the comparator 44 compares R with RTH. The threshold (TH) updating unit 45 updates the threshold TH as decreasing it, if the ratio R is larger than RTH. If the ratio R is smaller than RTH, the updating unit 45 updates the threshold TH as increasing it.

(5) The steps of from (2) to (4) are repeated for all candidate blocks, and a motion vector finally stored in the register 8 is determined as an optimum motion vector.

The processing in (4) can be executed for every candidate block or every completion of a predetermined number of candidate blocks. Also, RTH for comparison with the ratio R may have a certain width. Namely, the range of RTH may be set as α<RTH<β. Then, the threshold TH may be updated to decrease if R>β whereas the threshold TH may be updated to increase if R<α. Alternatively, the threshold TH may be updated to decrease if R>α, whereas the threshold TH may be undated to increase if R<β. Further, the ratio R does not always have to be obtained by division. For example, it can be obtained by utilizing a ROM table which outputs a ratio R under a predetermined rule when the value of counter 41 and the value of counter 42 are input thereinto, for example.

The treatment is the same as in the first embodiment if prediction errors PE1 of all candidate blocks are larger than the threshold TH.

Next described is the computational complexity necessary for block matching in the above method. Here, "sub" means subtraction, "add" addition, and "ops" computational complexity. Also, it is assumed that a block is a square block in the size of 16×16 pixels, the search range of motion vector is a square region between −15 and +15 both in the horizontal direction and in the vertical direction, and the accuracy of motion vector is one pixel unit.

Supposing L1=16 and L2=256, the computational complexity necessary in the above processing is calculated as follows.

Computation of prediction error PE1: 16 (sub)+15 (add)= 31 ops

Comparison between prediction error PE1 and threshold TH: 1 ops

Computation of prediction error PE2: 240 (sub)+240 (add)=480 ops

Comparison between prediction error PE2 and minimum value MIN_PE: 1 ops

Thus, letting α be the number of candidate blocks used for calculation of prediction error PE2, the computational complexity is as follows:

$$(31+1) \times 31^2 + (480+1) \times \alpha = 30752 + 481 \; \alpha \; ops.$$

As described above, the prediction error PE2 is calculated only for candidate blocks with prediction error PE1 not more than the threshold TH, whereby a motion vector can be obtained by computational complexity less than that by the full search.

Optionally, a maximum value of number of candidate blocks for calculation of prediction error PE2 may be set to M (<N). Then, if the number of candidate blocks already used for calculation of prediction error PE2 reaches M, the search can be stopped thereafter, whereby the computational complexity can be kept below a certain level.

Figure 5:
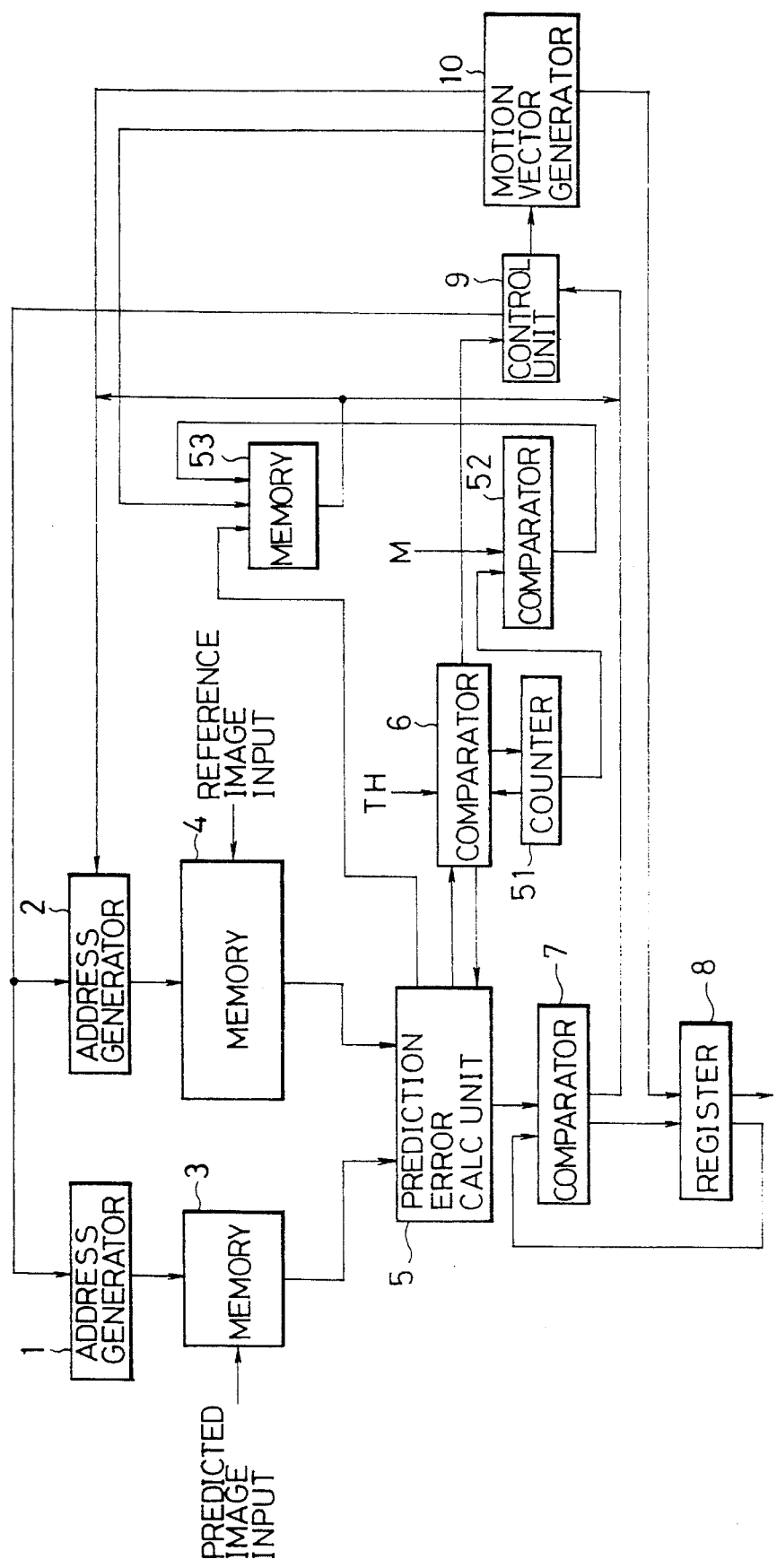
FIG. 5 is a drawing to show a fifth embodiment of motion vector detecting circuit according to the present invention.

FIG. 5 is a drawing to show a fifth embodiment of motion vector detecting circuit according to the present invention. The present embodiment has a circuit arrangement obtained by adding a counter 51, a comparator 52 and a memory 53 to the circuit shown in FIG. 1.

The counter 51 counts a current number of candidate blocks with prediction error PE1 not more than the threshold TH. The comparator 52 compares a value of counter 51 with a value of maximum M (<N) of number of candidate blocks for calculation of prediction error PE2. The memory 53 is a memory for storing information of candidate blocks with prediction error PE1 not more than the threshold TH (prediction errors PE1 and motion vectors). In this embodiment, the information is stored using a binary tree based on the values of prediction errors PE1.

The processing procedure is described in the following.

(1) The counters 51 is set to 0, the threshold of prediction error PE1 to TH, and the maximum of number of candidate blocks for calculation of prediction error PE2 to M.

(2) The prediction error calculating unit 5 calculates a prediction error PE1 using L1 (<L) pixels in a block for each of all candidate blocks, and the comparator 6 compares the prediction error PE1 with the threshold TH. If a prediction error PE1 is not more than the threshold TH, a motion vector to a present candidate block and the prediction error PE1 are stored in the memory 58 in the form of binary tree, and the counter 51 is given an increment.

(3) The comparator 52 compares a value of counter 51 with M. If the value of counter 51 is not more than M, the prediction error calculating unit 5 calculates a prediction error PE2 using L2 (L1<L2≤L) pixels for each of all candidate blocks stored in the memory 53. If the value of counter 51 is larger than M, the prediction error calculating unit 5 calculates a prediction error PE2 using L2 pixels for each of M candidate blocks as tracing the binary tree in memory 53 from the minimum prediction error PE1. In obtaining the prediction error PE2 the comparator 7 compares the prediction error PE2 with the minimum value MIN PE. If the prediction error PE2 is smaller than the minimum value MIN_PE, the prediction error PE2 is stored as a new minimum value MIN_PE in the register 8 together with a motion vector thereof.

(4) A motion vector finally stored in the register 8 is determined as an optimum motion vector.

The treatment is the same as in the first embodiment if prediction errors PE1 of all candidate blocks are larger than the threshold TH.

Next described is the computational complexity necessary for block matching in the above method. Here, "sub" means subtraction, "add" addition, and "ops" computational complexity. Also, it is assumed that a block is a square block in the size of 16×16 pixels, the search range of motion vector is a square region between −15 and +15 both in the horizontal direction and in the vertical direction, and the accuracy of motion vector is one pixel unit.

Supposing L1=16 and L2=256, the computational complexity necessary in the above processing is calculated as follows.

Computation of prediction error PE1: 16 (sub)+15 (add)= 31 ops

Comparison between prediction error PE1 and threshold TH: 1 ops

Computation of prediction error PE2: 240 (sub)+240 (add)=480 ops

Comparison between prediction error PE2 and minimum value MIN_PE: 1 ops

Thus, letting α be the number of candidate blocks to obtain the prediction error PE2, the computational complexity is as follows:

(31+1)×31²+(480+1)×α=30752+481 α ops.

The maximum is 30752+481M ops.

As described above, the prediction error PE2 is obtained only for M or less candidate blocks with prediction error PE1 not more than the threshold TH, whereby the computational complexity can be made less than that by the full search and can be decreased below a certain level.

In the present invention, as detailed above, a motion vector detecting circuit is so arranged that in moving picture coding using the motion compensation prediction a motion vector is detected in the unit of block composed of L pixels by block matching between a block in a prediction target image and a candidate block in a reference image, wherein calculating means calculates a first prediction error by a matching operation between a block in a prediction target image and a candidate block as to L1 pixels less than L, and if the first prediction error is not more than a threshold the calculating means calculates a second prediction error to define a motion vector as to L2 pixels more than L1 but not more than L for the candidate block corresponding to said first prediction error, and comparing means compares second prediction errors to detect a minimum prediction error to define a motion vector among the second prediction errors calculated by the calculating means, whereby the computational complexity necessary for block matching can be greatly reduced and a motion vector with high accuracy can be detected.

Further embodiments of the present invention will be described with reference to the drawings. In the following embodiments, a motion vector is detected in the unit of block composed of L pixels between a block in a prediction target image and N candidate blocks in a reference image.

Figure 8:
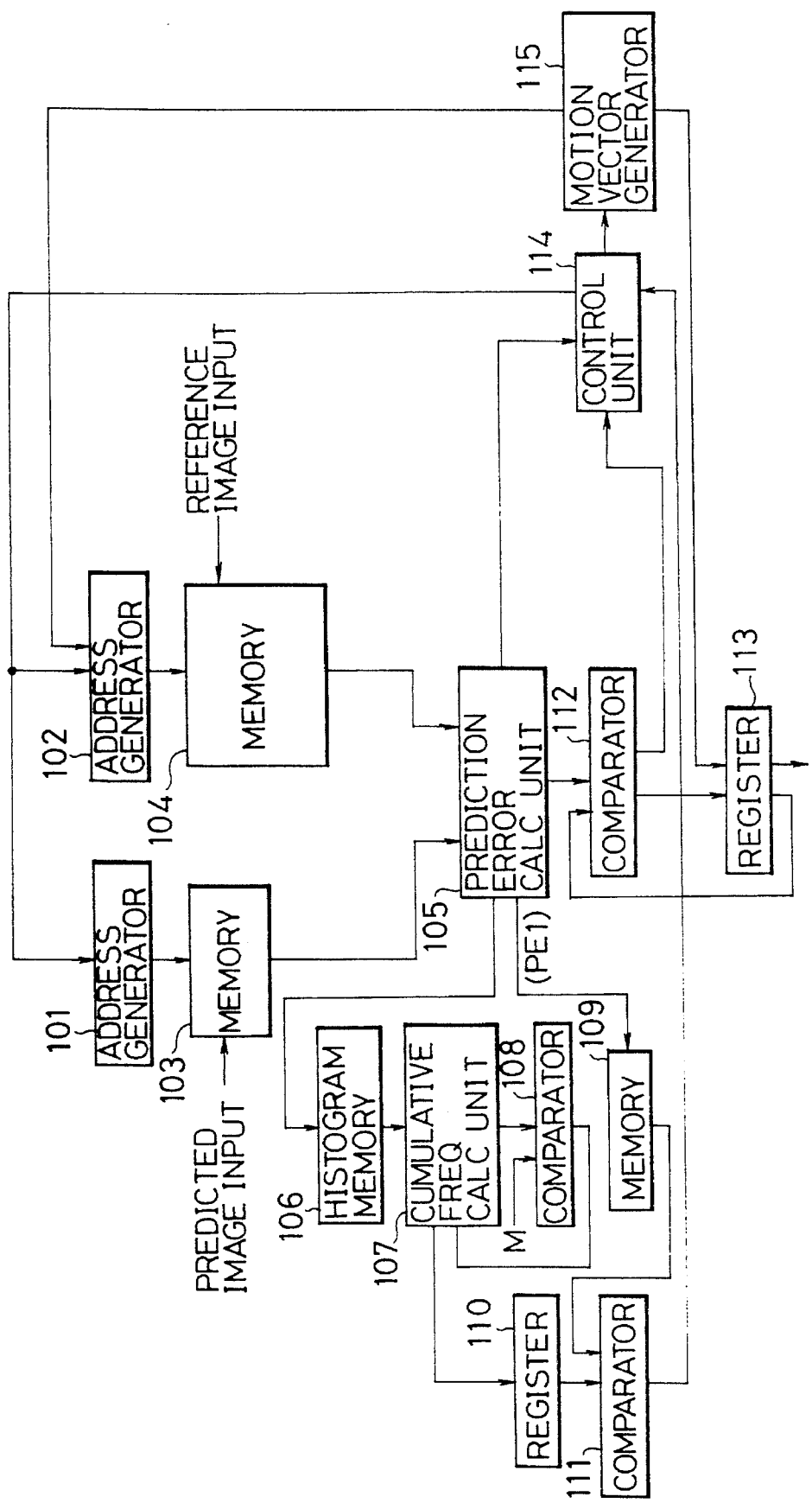
FIG. 8 is a block diagram to show a sixth embodiment of motion vector detecting circuit according to the present invention.

FIG. 8 is a block diagram to show a sixth embodiment of the present invention.

In FIG. 8, reference numeral 101 designates an address generator, which generates address information about L1 (<L) pixels used in obtaining a prediction error PE1 in a unit block and address information about L2 (L1<L2≤L) pixels used in obtaining a prediction error PE2 in accordance with a control signal from a control unit 114.

Here, the L2 pixels used in obtaining a prediction error PE2 include the L1 pixels used in obtaining a prediction error PE1. In obtaining a prediction error PE2 the address generator generates only address information about (L2-L1) pixels which were not used in obtaining the prediction error PE1, among the L2 pixels.

Numeral 102 also denotes an address generator, which generates address information about L1 pixels used in obtaining a prediction error PE1 in a candidate block corresponding to information on motion vector from a motion vector generator 115 and address information about L2 pixels used in obtaining a prediction error PE2 in a candidate block in accordance with a control signal from the control unit 114.

Here, the L2 pixels used in obtaining a prediction error PE2 include L1 pixels used in obtaining a prediction error PE1. In obtaining a prediction error PE2 the address generator generates only address information about (L2-L1) pixels which were not used in obtaining the prediction error PE1, among the L2 pixels in a candidate block.

Numeral 103 designates a memory for storing information of prediction target image in the unit of block, from which stored information is read out according to address information from the address generator 101.

Numeral 104 denotes a memory for storing information about search region in a reference image, from which stored information is read out according to address information from the address generator 102.

Numeral 105 denotes a prediction error calculating unit, which calculates a prediction error between a prediction target block and a candidate block.

In obtaining a prediction error PE2, the calculating unit calculates a prediction error for (L2-L1) pixels not used in obtaining a prediction error PE1, among the L2 pixels and adds the thus obtained prediction error to the prediction error PE1.

A possible method for obtaining a prediction error is for example one for calculating a cumulative sum of absolute values or squares of pixel value differences between corresponding pixels in a prediction target block and in a candidate block.

Numeral 106 denotes a memory for storing frequencies in histogram.

Numeral 107 represents a cumulative value calculating unit, which cumulatively adds the frequencies in histogram from a minimum prediction error PE1.

Numeral 108 designates a comparator, which compares a cumulative value of frequencies in histogram with a maximum value M (<N) of number of candidate blocks to obtain a prediction error PE2.

Numeral 109 is a memory for storing prediction errors PE1 of all candidate blocks.

Numeral 110 is a register, which stores a value of maximum prediction error PE1 with which the cumulative value of frequencies in histogram is not more than M, as threshold TH.

Numeral 111 is a comparator, which compares a prediction error PE1 stored in the memory 109 with the threshold TH.

Numeral 112 is a comparator, which compares a prediction error PE2 with the minimum value MIN_PE stored in a register 113.

The register 113 stores a minimum value MIN PE of prediction error PE2 and a motion vector giving MIN_PE.

Numeral 114 is a control unit, which receives results of the prediction error calculating unit 105, the comparator 111 and the comparator 112, and generates a control signal for obtaining a prediction error PE1 and a control signal for obtaining a prediction error PE2.

Numeral 115 is a motion vector generator, which generates a motion vector in a predetermined order under control of the control unit 114.

The processing procedure is next described.

(0) The maximum value of number of candidate blocks to obtain a prediction error PE2 is set to M (<N).

Figure 9:
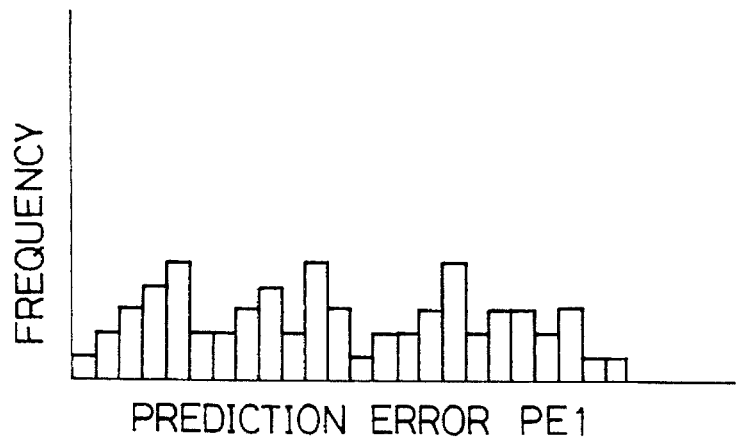
FIG. 9 is a drawing to show a histogram with the horizontal axis representing prediction error PE1.

(1) The prediction error calculating unit 105 calculates a prediction error PE1 using L1 (<L) pixels in a block and stores the prediction error PE1 in the memory 109 while giving an increment to a value at a position of the prediction error PE1 in the histogram memory 108. The prediction error calculating unit 105 repeats this process for all candidate blocks in the order of motion vector which is generated by the motion vector generator 115. After this processing, a histogram with prediction error PE1 on the horizontal axis as shown in FIG. 9 is obtained in the histogram memory 106.

Figure 10:
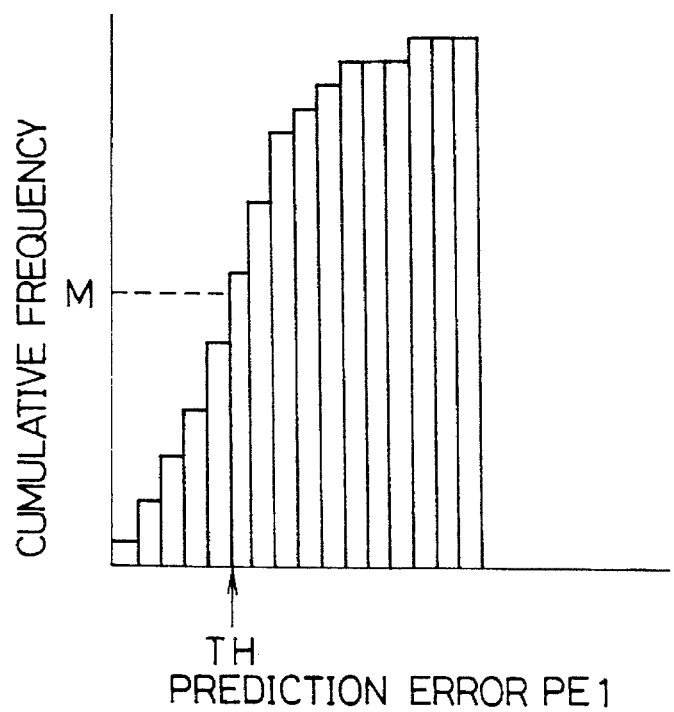
FIG. 10 is a drawing to illustrate how to determine a threshold TH in the sixth embodiment.

(2) Referring to the histogram memory 106, the cumulative value calculating unit 107 cumulatively adds the frequencies from the minimum prediction error PE1 as shown in FIG. 10. The comparator 108 compares the cumulative value with M. This process is repeated before the cumulative value exceeds M. A value of maximum prediction error PE1 before the cumulative value exceeds M is stored as threshold TH in the register 110.

(3) The comparator 111 compares the prediction errors PE1 stored in the memory 109 with the threshold TH in order. Only for candidate blocks with prediction error PE1 not more than the threshold TH, the prediction error calculating unit 105 calculates a prediction error PE2 using L2 (L1<L2≦L) pixels.

In obtaining a prediction error PE2, the comparator 112 compares a prediction error PE2 with the minimum value MIN_PE. If the prediction error PE2 is smaller than the minimum value MIN_PE, the prediction error PE2 is stored as a new minimum value MIN_PE in the register 113 together with a motion vector thereof.

(4) A motion vector finally stored in the register 113 is determined as an optimum motion vector.

As the initial setting for the above processing, the minimum value MIN_PE of prediction error PE2 is set to a maximum value which the prediction error PE2 can take, in the register 113.

Also, there are the following methods to determine a motion vector when the threshold TH is set to 0.

(1) A specific motion vector is employed as an optimum motion vector.

(2) A same motion vector as one obtained for previous prediction target block is employed as an optimum motion vector.

(3) A motion vector to a candidate block giving a minimum prediction error PE1 is employed as an optimum motion vector.

The method (1) can be so realized that in initial setting, specific values, for example (0, 0), are set as the motion vector in the register 113.

The method (2) can be so realized that in initial setting, values in previous processing are maintained without setting a motion vector in register 113.

Figure 11:
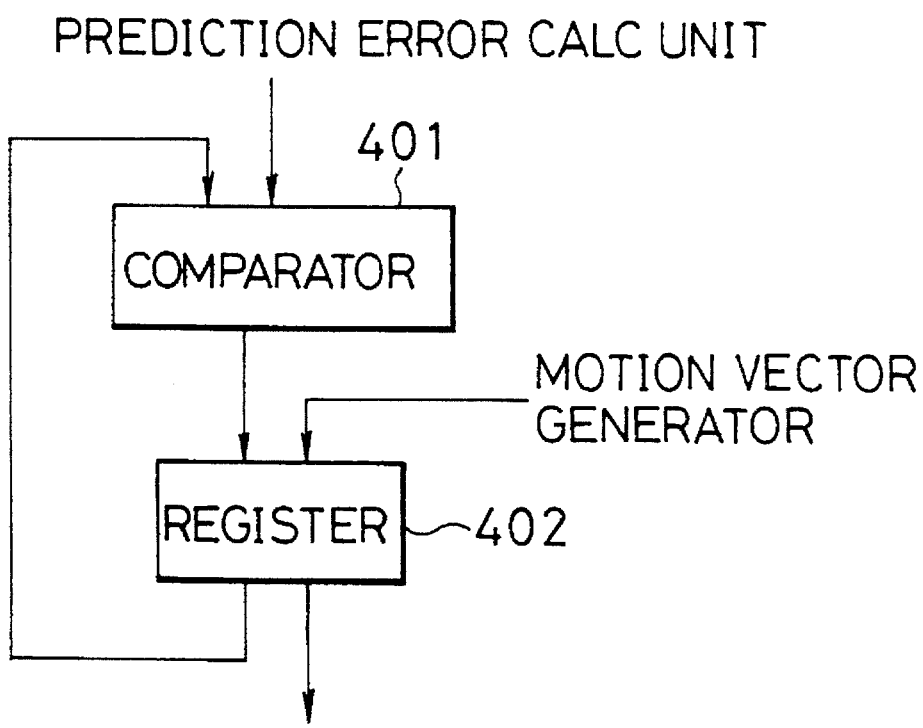
FIG. 11 is a block diagram to illustrate means for obtaining a minimum value of prediction error PE1.

The method (3) can be so realized that means is provided for storing a minimum value of prediction error PE1 and values of a motion vector thereof. In this case, a comparator 401 and a register 402 as shown in FIG. 11 are added to the prediction error calculating unit 105.

The comparator 401 compares a prediction error PE1 with a minimum value of prediction error PE1 stored in the register 402, and the register 402 stores a minimum value of prediction error PE1 and a motion vector thereof.

The register 402 is updated if the prediction error PE1 is smaller than a minimum value of prediction error PE1 already stored.

Next described is the computational complexity necessary for block matching in the above method.

Here, "sub" means subtraction, "add" addition, and "ops" computational complexity.

Also, it is assumed that a block is a square block in the size of 16×16 pixels, the search range of motion vector is a square region between −15 and +15 both in the horizontal direction and in the vertical direction, and the accuracy of motion vector is one pixel unit.

Supposing a prediction error is calculated as a sum of absolute values of pixel value differences, L1=16, and L2=256, the computational complexity necessary for the above processing is calculated as follows.

Computation of prediction error PE1: 16 (sub)+15 (add)= 31 ops

Comparison between prediction error PE1 and threshold TH: 1 ops

Computation of prediction error PE2: 240 (sub)+240 (add)=480 ops

Comparison between prediction error PE2 and minimum value: 1 ops

Letting $\alpha$ ($\leq M$) be the number of blocks to obtain a prediction error, the computational complexity is as follows:

$$(31+1) \times 31^2 + (480+1) \times \alpha = 30752 + 481 \alpha \text{ ops.}$$

The maximum value is 30752+481M ops.

As described above, the prediction error PE2 is calculated only for M or less candidate blocks with prediction error PE1 not more than the threshold TH, whereby the computational complexity can be reduced less than that by the full search and lowered below a certain level.

Next described is a seventh embodiment of motion vector detecting circuit according to the present invention.

Figure 12:
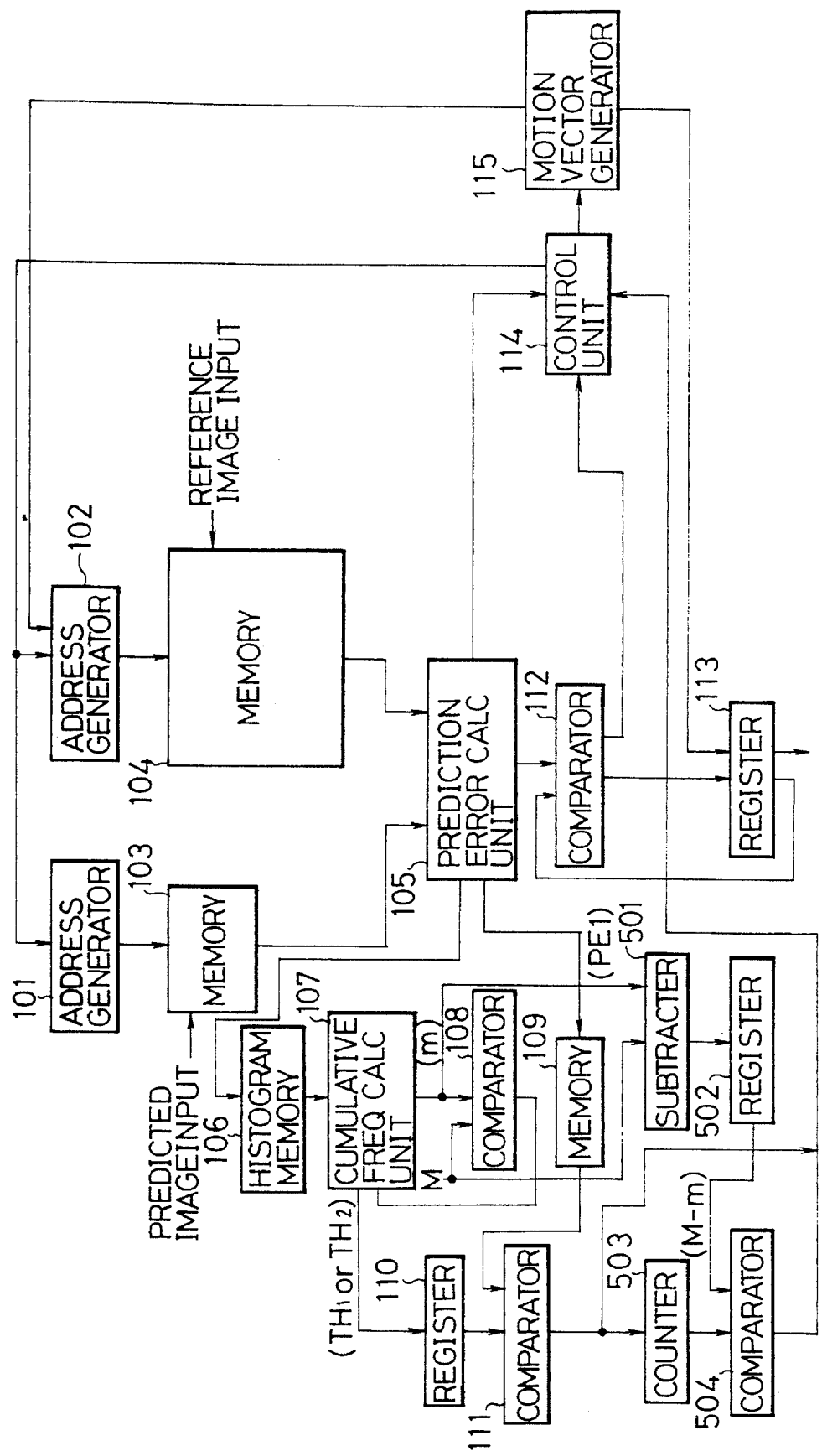
FIG. 12 is a block diagram to show a seventh embodiment of motion vector detecting circuit according to the present invention.

FIG. 12 is a block diagram to show the seventh embodiment of the present invention.

The present embodiment is partially different in functions of register 110 and comparator 111 from the sixth embodiment described referring to FIG. 8 and has a circuit arrangement obtained by adding a subtracter 501, a register 502, a counter 503, and a comparator 504 to the circuit in the sixth embodiment.

The register 110 stores as threshold TH1 a value of maximum prediction error PE1 with which a cumulative value of frequencies in histogram is not more than the maximum value M (<N) of number of candidate blocks to obtain a prediction error PE2, and as threshold TH2 a value of minimum prediction error PE1 with which a cumulative value is more than M.

The comparator 111 compares a prediction error PE1 stored in the memory 109 with the threshold TH1 and the threshold TH2.

The subtracter 501 calculates a difference between M and a cumulative value m of frequencies in the region where the predictive error PE1 is not more than the threshold TH1 in histogram.

The register 502 stores the value of (M−m) obtained by the subtracter 501.

The counter 503 counts the number of candidate blocks with prediction error PE1 larger than the threshold TH1 but not more than the threshold TH2.

There are the following methods for selecting (M−m) candidate blocks out of candidate blocks with prediction error PE1 larger than the threshold TH1 but not more than the threshold TH2.

(1) Candidate blocks are selected in the order of magnitude of prediction error PE1 from the smallest.

(2) Candidate blocks are selected in the order in which the motion vector generator 115 generates corresponding motion vectors, from the earliest.

This embodiment employs the method in (2).

The comparator 504 compares a value of counter 503 with a value of (M−m).

The processing procedure is described in the following.

(0) The counter 503 is set to 0, and the maximum value of number of candidate blocks to obtain a prediction error PE2 to M (<N).

(1) The prediction error calculating unit 105 calculates a prediction error PE1 using L1 (<L) pixels in a block and stores the prediction error PE1 in the memory 109 while giving an increment to a value at a position to which the prediction error PE1 belongs in the histogram memory 106. This process is repeated for all candidate blocks in the order in which the motion vector generator 115 generates corresponding motion vectors.

Figure 13:
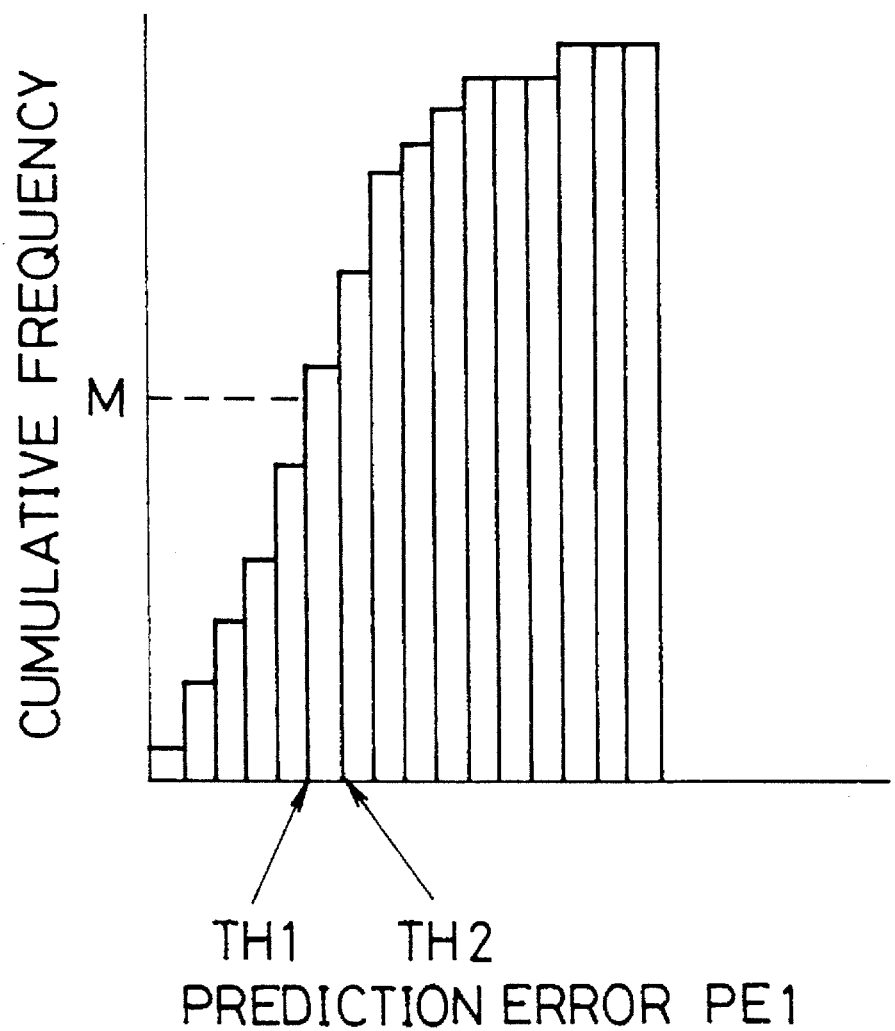
FIG. 13 is a drawing to illustrate how to determine a threshold TH1 and a threshold TH2 in the seventh embodiment.

(2) Referring to the histogram memory 106, the cumulative value calculating unit 107 cumulatively adds frequencies from the smallest prediction error PE1 as shown in FIG. 13, and the comparator 108 compares the cumulative value with M. This process is repeated before the cumulative value exceeds M. A value of maximum prediction error PE1 giving a cumulative value not more than M is stored as threshold TH1 in the register 110, and setting the cumulative value at that time to m, a result of subtraction of m from M in the subtracter 501 is stored in the register 502. Also, a value of minimum prediction error PE1 giving a cumulative value exceeding M is stored as threshold TH2 in the register 110.

If m is equal to M, TH2 is equal to TH1.

(3) The comparator 111 compares the prediction errors PE1 stored in the memory 109 with the threshold TH1 and the threshold TH2 in order. If a prediction error PE1 is not more than the threshold TH1, the prediction error calculating unit 105 calculates a prediction error PE2 for the candidate block using L2 (L1<L2≦L) pixels.

If a prediction error PE1 is larger than the threshold TH1 but not more than the threshold TH2, an increment is given to the counter 503 and the comparator 504 compares a value of counter 503 with a value of register 502. If the value of counter 503 is not more than the value of register 502, a prediction error PE2 is calculated for the candidate block. In other words, a prediction error PE2 is calculated only for (M−m) candidate blocks which correspond to earliest motion vectors generated by the motion vector generator 115 among the candidate blocks with prediction error PE1 larger than the threshold TH1 but not more than the threshold TH2.

In obtaining a prediction error PE2, the comparator 112 compares a prediction error PE2 with the minimum value MIN PE. If the prediction error PE2 is smaller than the minimum value MIN PE, the prediction error PE2 is assigned as a new minimum value MIN PE, which is stored in the register 113 together with a motion vector thereof.

(4) A motion vector finally stored in the register 113 is determined as an optimum motion vector.

In initial setting for the above procedure, a maximum value which the prediction error PE2 can take is set as the minimum value MIN PE of prediction error PE2 in the register 113.

Next described is the computational complexity necessary for block matching in the above method.

Here, "sub" means subtraction, "add" addition, and "ops" computational complexity.

Also, it is assumed that a block is a square block in the size of 16×16 pixels, the search range of motion vector is a square region between −15 and +15 both in the horizontal direction and in the vertical direction, and the accuracy of motion vector is one pixel unit.

Supposing a prediction error is calculated as a sum of absolute values of pixel value differences, L1=16, and L2=256, the computational complexity necessary for the above processing is calculated as follows.

Computation of prediction error PE1: 16 (sub)+15 (add)= 31 ops

Comparison between prediction error PE1 and threshold TH1: 1 ops

Comparison between prediction error PE1 and threshold TH2: 1 ops

Computation of prediction error PE2: 240 (sub)+240 (add)=480 ops

Comparison between prediction error PE2 and minimum value: 1 ops

Thus, the computational complexity is as follows:

$$(31+1+1)\times 31^2+(480+1)\times M=31713+481M \text{ ops.}$$

Actually, the comparison between prediction error PE1 and threshold TH2 is necessary only for candidate blocks with prediction error PE1 larger than the threshold TH1. Also, the comparison can be stopped once (M−m) candidate blocks are selected out of candidate blocks with prediction error PE1 larger than the threshold TH1 but not more than the threshold TH2.

As described above, a prediction error PE2 is calculated only for M candidate blocks with prediction error PE1 not more than the threshold TH2, whereby the computational complexity can be made lower than that by the full search and decreased to a constant level.

The following shows results in cases in which the above method is applied to a motion vector detecting portion in moving picture coding method MPEG2 under progress of standardization by ISO.

In obtaining a prediction error PE1, sixteen pixels at locations as shown in FIG. 6 were employed and M was 70.

Sequence 1 is a 2-sec moving picture with panning, and Sequence 2 is a 2-sec moving picture having a lot of smooth regions, with zooming.

(1) Rate of candidate blocks omitted after comparison between PE1 and threshold (unit: %)

Sequence 1: 92.31; Sequence 2: 92.33

(2) SN ratio of luminance signal of reproduced image (unit: dB)

Results by the full search are also listed for reference.

Values in parentheses are differences from those by the full search.

| Full search | Present method |
| --- | --- |
| Sequence 1 | |
| 28.02 | 28.00 (−0.02) |
| Sequence 2 | |
| 31.14 | 31.12 (−0.02) |

The above results ensure that the present method can provide a motion vector substantially equivalent in quality of reproduced image (SN ratio) to that by the full search even if the computational complexity is cut about 90%.

Figure 14:
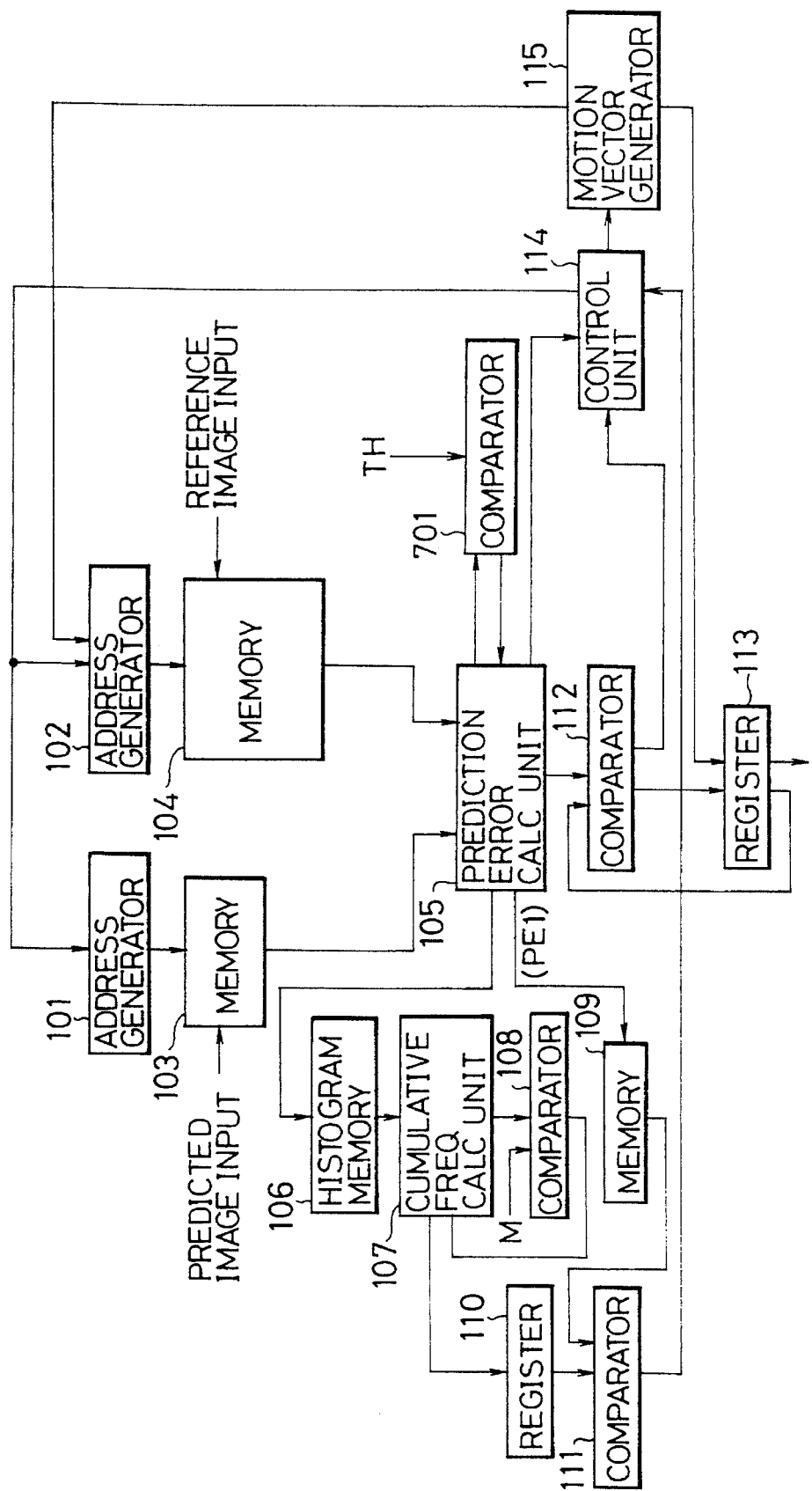
FIG. 14 is a block diagram to show an eighth embodiment of motion vector detecting circuit according to the present invention.

Next described referring to FIG. 14 is an eighth embodiment of motion vector detecting circuit according to the present invention.

FIG. 14 is a block diagram to show the eighth embodiment of motion vector detecting circuit.

The motion vector detecting circuit of the present embodiment is obtained by adding a comparator 701 for comparing a prediction error PE1 with threshold TH to the sixth embodiment as described referring to FIG. 8.

The processing procedure is described in the following.

(0) The threshold of prediction error PE1 is set to TH and a maximum value of number of candidate blocks to obtain a prediction error PE2 to M ($<N$).

(1) The prediction error calculating unit 105 calculates a prediction error PE1 using L1 ($<L$) pixels in a block and stores the prediction error PE1 in the memory 109, and the comparator 701 compares the prediction error PE1 with the threshold TH. If the prediction error PE1 is not more than the threshold TH, an increment is given to a value at a position to which the prediction error PE1 belongs in the histogram memory 106. This process is repeated for all candidate blocks in the order in which the motion vector generator 115 generates corresponding motion vectors.

(2) Referring to the histogram memory 106, the cumulative value calculating unit 107 cumulatively adds frequencies from the smallest prediction error PE1, and the comparator 108 compares the cumulative value with M. This process is repeated before the cumulative value exceeds M. A value of maximum prediction error PE1 giving a cumulative value not more than M is stored as threshold TH in register 110.

In case the total cumulative value of histogram is below M, the threshold TH is not updated.

(3) The comparator 111 compares the prediction errors stored in the memory 109 with the threshold TH in order, and the prediction error calculating unit 105 calculates a prediction error PE2 only for candidate blocks with prediction error PE1 not more than the threshold TH, using L2 ($L1<L2\leq L$) pixels.

In obtaining a prediction error PE2, the comparator 112 compares a prediction error PE2 with the minimum value MIN_PE. If the prediction error PE2 is smaller than the minimum value MIN_PE, the prediction error PE2 is assigned as a new minimum value MIN_PE, which is stored in the register 113 together with a motion vector thereof.

(4) A motion vector finally stored in the register 113 is determined as an optimum motion vector.

In initial setting for the above processing, a maximum value which the prediction error PE2 can take is set as the minimum value MIN_PE of prediction error PE2 in the register 113, and a threshold TH before updated is set as an initial value of register 110.

Also, the treatment is the same as in the sixth embodiment described with FIG. 8, if the threshold TH is set to 0 in (2).

Next described is the computational complexity necessary for block matching in the above method.

Here, "sub" means subtraction, "add" addition, and "ops" computational complexity.

Also, it is assumed that a block is a square block in the size of 16×16 pixels, the search range of motion vector is a square region between −15 and +15 both in the horizontal direction and in the vertical direction, and the accuracy of motion vector is one pixel unit.

Supposing a prediction error is calculated as a sum of absolute values of pixel value differences, L1=16, and L2=256, the computational complexity necessary for the above processing is calculated as follows.

Computation of prediction error PE1: 16 (sub)+15 (add)= 31 ops

Comparison between prediction error PE1 and threshold TH: 1 ops

Computation of prediction error PE2: 240 (sub)+240 (add)=480 ops

Comparison between prediction error PE2 and minimum value: 1 ops

Letting $\alpha$ ($\leq M$) be the number of blocks to obtain a prediction error, the computational complexity is as follows:

$$(31+1)\times 31^2+(480+1)\times\alpha=30752+481\alpha \text{ ops.}$$

The maximum value is 30752+481M ops.

As described above, a prediction error PE2 is calculated only for M or less candidate blocks with prediction error PE1 not more than the threshold TH, whereby the computational complexity is made smaller than that by the full search and cut below a certain level.

Figure 15:
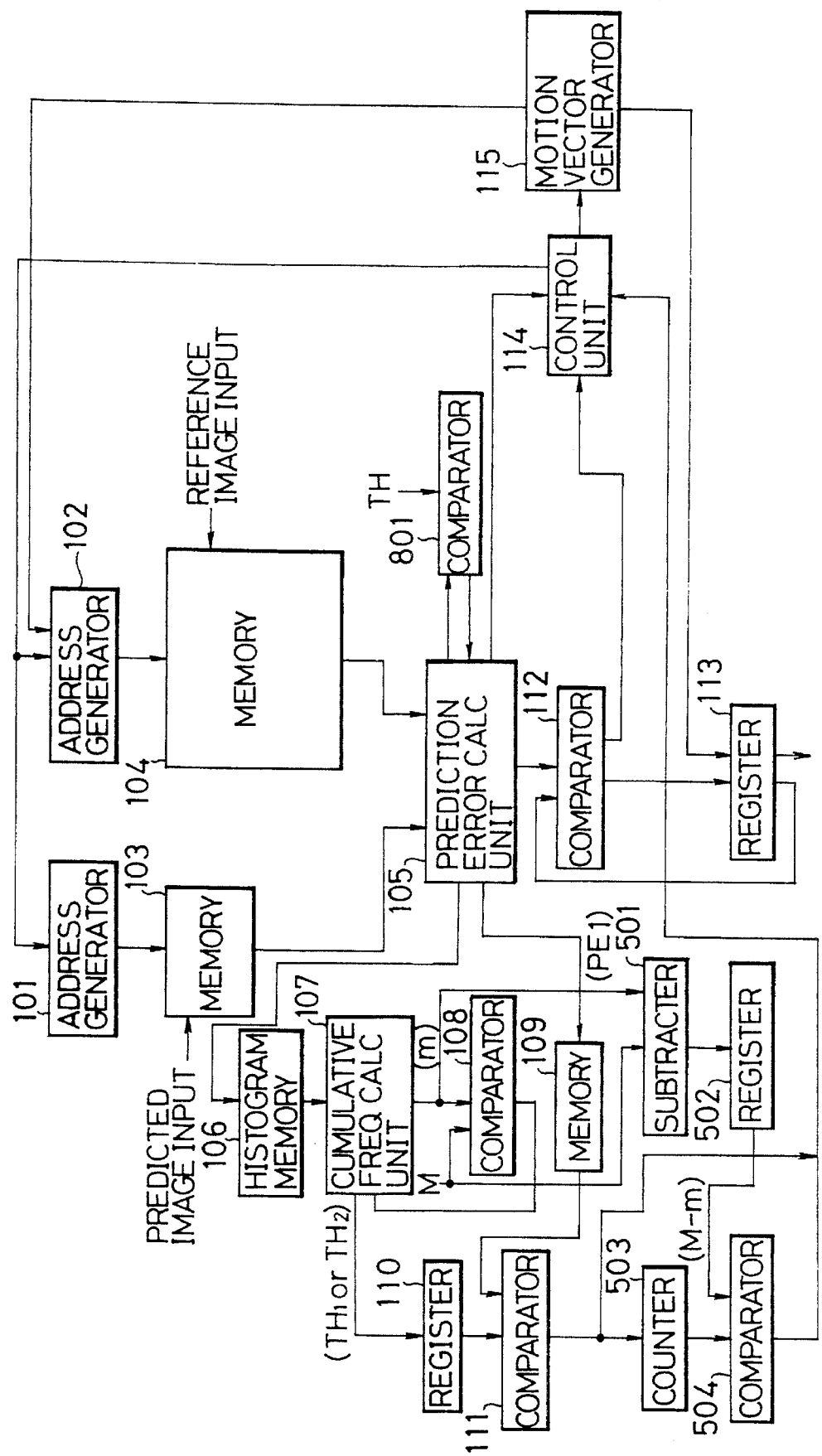
FIG. 15 is a block diagram to show a ninth embodiment of motion vector detecting circuit according to the present invention.

Next described referring to FIG. 15 is a ninth embodiment of motion vector detecting circuit according to the present invention.

FIG. 15 is a block diagram to show the ninth embodiment of motion vector detecting circuit.

The motion vector detecting circuit of the present embodiment is obtained by adding a comparator 801 for comparing a prediction error PE1 with threshold TH to the seventh embodiment as described referring to FIG. 12.

The comparator 801 compares a prediction error PE1 with the threshold TH.

(M−m) candidate blocks are selected from candidate blocks with prediction error PE1 larger than the threshold TH1 but not more than the threshold TH2 in such a manner that candidate blocks are successively selected in the order of generation of corresponding motion vectors by the motion vector generator 115.

The processing procedure is described in the following.

(0) The counter 503 is set to 0, the threshold of prediction error PE1 to TH, and a maximum value of number of candidate blocks to obtain a prediction error PE2 to M (<N):

(1) The prediction error calculating unit 105 calculates a prediction error PE1 using L1 (<L) pixels in a block and stores the prediction error PE1 in the memory 109 and the comparator 801 compares the prediction error PE1 with the threshold TH. If the prediction error PE1 is not more than the threshold TH, an increment is given to a value at a position to which the prediction error PE1 belongs in the histogram memory 108. This process is repeated for all candidate blocks in the order in which the motion vector generator 115 generates corresponding motion vectors.

(2) Referring to the histogram memory 106, the cumulative value calculating unit 107 cumulatively adds frequencies from the smallest prediction error PE1, and the comparator 108 compares a cumulative value with M. This process is repeated before the cumulative value exceeds M. A value of maximum prediction error PE1 giving a cumulative value not more than M is stored as threshold TH1 in the register 110, and setting the cumulative value at that time to m, the subtracter 501 stores a result of subtraction of m from M in the register 502.

Also, a value of minimum prediction error PE1 giving a cumulative value exceeding M is stored as threshold TH2 in the register 110.

If m is equal to M, TH2 is equal to TH1.

If the total cumulative value of histogram is below M, the thresholds are set as TH1=TH2=TH.

(3) The comparator 111 compares the prediction errors PE1 stored in the memory 109 with the threshold TH1 and the threshold TH2 in order. If a prediction error PE1 is not more than the threshold TH1, the prediction error calculating unit 105 calculates a prediction error PEP, for that candidate block using L2 (L1<L2≦L) pixels.

If a prediction error PE1 is larger than the threshold TH1 but not more than the threshold TH2, the counter 503 is given an increment, and the comparator 504 compares a value of counter 503 with a value of register 502. If the value of counter 503 is not more than the value of register 502, a prediction error PE2 is calculated for that candidate block. In other words, among candidate blocks with prediction error PE1 larger than the threshold TH1 but not more than the threshold TH2, a prediction error PE2 is calculated only for (M−m) candidate blocks having earliest corresponding motion vectors generated by the motion vector generator 115.

In obtaining a prediction error PE2, the comparator 112 compares a prediction error PE2 with a minimum value MIN PE. If the prediction error PE2 is smaller than the minimum value MIN_PE, the prediction error PE2 is assigned as a new minimum value MIN_PE, which is stored in the register 113 together with a motion vector thereof.

(4) A motion vector finally stored in the register 113 is determined as an optimum motion vector.

In initial setting for the above processing, a maximum value which the prediction error PE2 can take is set as minimum value MIN_PE of prediction error PE2 in the register 113, and the threshold TH is set as the threshold TH1 and as the threshold TH2 in the register 110.

Next described is the computational complexity necessary for block matching in the above method.

Here, "sub" means subtraction, "add" addition, and "ops" computational complexity.

Also, it is assumed that a block is a square block in the size of 16×16 pixels, the search range of motion vector is a square region between −15 and +15 both in the horizontal direction and in the vertical direction, and the accuracy of motion vector is one pixel unit.

Supposing a prediction error is calculated as a sum of absolute values of pixel value differences, L1=16, and L2=256, the computational complexity necessary for the above processing is calculated as follows.

Computation of prediction error PE1: 16 (sub)+15 (add)= 31 ops

Comparison between prediction error PE1 and threshold TH: 1 ops

Comparison between prediction error PE1 and threshold TH1: 1 ops

Comparison between prediction error PE1 and threshold TH2: 1 ops

Computation of prediction error PE2: 240 (sub)+240 (add)=480 ops

Comparison between prediction error PE2 and minimum value: 1 ops

Thus, letting α (≦M) be the number of blocks to obtain a prediction error for all pixels, the computational complexity is as follows:

$$(31+1+1+1)\times 31^2+(480+1)\times \alpha=32674+481\ \alpha\ ops.$$

The maximum value is 32674+481M ops.

Actually, the comparison between prediction error PE1 and threshold TH2 is necessary only for candidate blocks with prediction error PE1 larger than the threshold TH1. Also, the comparison can be omitted after (M−m) candidate blocks are selected from those with prediction error PE1 larger than the threshold TH1 but not more than the threshold TH2.

As described above, a prediction error PE2 is calculated only for M or less candidate blocks with prediction error PE1 not more than the threshold TH2, whereby the computational complexity can be made lower than that by the full search and decreased below a certain level.

The following shows results in cases in which the above method is applied to a motion vector detecting portion in moving picture coding method MPEG2 under progress of standardization by ISO.

In obtaining a prediction error PE1, sixteen pixels at locations as shown in FIG. 6 were employed and TH was 320 and M was 70.

Sequence 1 is a 2-sec moving picture with panning, and Sequence 2 a 2-sec moving picture having a lot of smooth regions, with zooming.

(1) Rate of candidate blocks omitted after comparison between PE1 and threshold (unit: %)

Sequence 1: 95.93; Sequence 2: 93.47

(2) SN ratio of luminance signal of reproduced image (unit: dB)

Results by the full search are also listed for reference.

Values in parentheses are differences from those by the full search.

| Full search | Present method |
|---|---|
| Sequence 1 | |
| 28.02 | 27.92 (−0.10) |
| Sequence 2 | |
| 31.14 | 31.08 (−0.06) |

It is seen from the above results that the present method can provide a motion vector substantially equivalent in quality of reproduced image (SN ratio) to that by the full search even if the computational amount is cut about 90%.

Many widely different embodiments of the present invention may be constructed without departing from the spirit and scope of the present invention. It should be understood that the present invention is not limited to the specific embodiments described in the specification, except as defined in the appended claims.

What is claimed is:

1. A motion vector detecting circuit for detecting a motion vector in moving picture coding using motion compensation prediction in the unit of block composed of L pixels by block matching between a block in a prediction target image and a candidate block in a reference image, comprising:

calculating means for calculating a first prediction error (PE1) between a block in a prediction target image and a candidate block in a reference image using L1 (<L) pixels in block, comparing the first prediction error thus calculated with a threshold (TH), and calculating a second prediction error (PE2) between a block in the prediction target image and a candidate block in the reference image using L2 (L1<L2≦L) pixels in block if a first prediction error of said candidate block is not more than said threshold (TH); and comparing means for comparing said second prediction error with a predetermined value (MIN_PE) and, if said second prediction error is smaller than said predetermined value (MIN_PE), replacing said predetermined value (MIN_PE) with said second prediction error, whereby a motion vector to a candidate block giving a minimum second prediction error is determined as an optimum motion vector.

2. A motion vector detecting circuit according to claim 1, wherein said calculating means comprises a prediction error calculating unit for calculating the first prediction error (PE1) and the second prediction error (PE2), a comparator for comparing the first prediction error (PE1) with the threshold value (TH), and a control unit for controlling operations of said prediction error calculating unit and said comparator.

3. A motion vector detecting circuit according to claim 2, wherein said calculating means further comprises a counter for counting a number of candidate blocks used in calculating second prediction errors thereof (PE2), a comparator for comparing said number with a predetermined value (M), and a control unit for finishing the block matching between a prediction target image and a reference image when said number reaches the predetermined value (M).

4. A motion vector detecting circuit according to claim 3, wherein said predetermined value (M) is smaller than a total number (N) of candidate blocks in a reference image.

5. A motion vector detecting circuit according to claim 3, wherein said calculating means further comprises an updating unit for adjusting said predetermined value (M) and said threshold (TH).

6. A motion vector detecting circuit according to claim 5, wherein when a number of candidate blocks used in calculating second prediction errors thereof (PE2) reaches said predetermined value (M), said updating unit updates to increase said predetermined value (M) and updates to decrease said threshold (TH).

7. A motion vector detecting circuit according to claim 3, further comprising a memory for storing information about candidate blocks with a first prediction error (PE1) not more than the threshold (TH), wherein said calculating means calculates second prediction errors (PE2) in the order of the first prediction errors (PE1) stored in the memory from the smallest.

8. A motion vector detecting circuit according to claim 7, wherein a number of candidate blocks to calculate a second prediction error is not more than a selected value 9. A motion vector detecting circuit according to claim 2 wherein said calculating means further comprises means for calculating a ratio (R) of a number of candidate blocks used in calculating second prediction errors thereof (PE2), to a number of candidate blocks used in calculating first prediction error thereof (PE1), and updating means for adjusting the threshold (TH) according to said ratio (R).

10. A motion vector detecting circuit according to claim 9, wherein said updating means comprises a comparator for comparing said ratio (R) with a predetermined value (RTH), and an updating unit for adjusting said threshold (TH) in accordance with comparison by said comparator, wherein said updating unit updates to decrease the threshold (TH) if said ratio (R) is larger than the predetermined value (RTH), while the updating unit updates to increase the threshold (TH) if said ratio (R) is smaller than the predetermined value (RTH).

11. A motion vector detecting circuit according to claim 1, wherein said comparing means comprises a comparator for comparing the second prediction error (PE2) with the predetermined value (MIN_PE), a register for storing the predetermined value (MIN_PE) and an optimum motion vector, and a control unit for controlling operations of said comparator and said register.

12. A motion vector detecting circuit according to claim 1, wherein said calculating means comprises:

means for calculating a first prediction error (PE1) for all candidate blocks and stores the first prediction errors thereof;

means for producing a histogram of the first prediction errors;

means for calculating a cumulative value of frequencies of the first prediction errors in the histogram from the smallest;

means for comparing said cumulative value with a predetermined value (M);

storing means for storing as a threshold (TH) a maximum first prediction error with a cumulative value not more than said predetermined value (M);

comparing means for comparing said stored first prediction errors of all candidate blocks with said threshold (TH) in order; and calculating means for calculating a second prediction error (PE2) for candidate blocks with a first prediction error not more than the threshold (TH).

13. A motion vector detecting circuit according to claim 12, wherein said storing means stores as a first threshold (TH1) a maximum first prediction error with a cumulative value not more than said predetermined value (M), a value (M−m) obtained by subtracting a cumulative value (m) thereat from the predetermined value (M), and as a second threshold (TH2) a minimum first prediction error with a cumulative value exceeding said predetermined value (M) ;

wherein said comparing means compares the stored first prediction errors of all candidate blocks with said first and second thresholds (TH1, TH2) in order; and wherein said calculating means calculates a second prediction error (PE2) for candidate blocks with a first prediction error not more than the first threshold (TH1) and calculates a second prediction error (PE2) for (M−m) candidate blocks among candidate blocks with a first prediction error larger than the first threshold (TH1) but not more than the second threshold (TH2).

14. A motion vector detecting circuit according to claim 13, wherein said histogram producing means produces a histogram only for candidate blocks with a first prediction error (PE1) not more than the threshold (TH).

15. A motion vector detecting circuit according to claim 12, wherein said histogram producing means produces a histogram only for candidate blocks with a first prediction error (PE1) not more than the threshold (TH).

* * * * *